United States Patent [19]

Shimoda

[11] Patent Number: 5,440,345
[45] Date of Patent: Aug. 8, 1995

[54] HIGH EFFICIENT ENCODING/DECODING SYSTEM

[75] Inventor: Kenji Shimoda, Kanagawa, Japan

[73] Assignee: Kabushiki Kaisha Toshiba, Kanagawa, Japan

[21] Appl. No.: 92,423

[22] Filed: Jul. 16, 1993

[30] Foreign Application Priority Data

Jul. 17, 1992 [JP] Japan ............................. 4-191045
Feb. 12, 1993 [JP] Japan ............................. 5-024562

[51] Int. Cl.⁶ .................................... H04N 7/50
[52] U.S. Cl. ............................ 348/411; 348/402; 348/423; 348/467
[58] Field of Search ........... 348/411, 420, 402, 423, 348/467; 358/335, 342, 310; H04N 7/50

[56] References Cited

U.S. PATENT DOCUMENTS 5,121,205 6/1992 Ng ........................... 348/467
5,191,436 3/1993 Yonemitsu ................. 358/335

FOREIGN PATENT DOCUMENTS 0536630 4/1993 European Pat. Off. .
0546865 6/1993 European Pat. Off. .
9110329 7/1991 WIPO .

OTHER PUBLICATIONS

"Video Codec Standardization in CCITT Study Group XV," Signal Processing: Image Communication, vol. 1, No. 1, Jun. 1989, Elsevier Science Publishers, pp. 45–54.

"Draft Revision of Recommendation H.261: Video Codec for Audiovisual Services at p x 64 kbits/s," Signal Processing: Image Communication, vol. 2, No. 2, Aug. 1990, Elsevier Science Publishers, pp. 221–239.

Primary Examiner—Howard W. Britton
Attorney, Agent, or Firm—Cushman, Darby & Cushman

[57] ABSTRACT

A high efficient encoding/decoding system has processor for processing a sub-macro block having at least one collection of blocks as an encoding unit of input data, and a macro block having a macro block length data for indicating the length of the macro block itself in its head position and at least one of the sub-macro blocks. The collection of blocks in the sub-macro block includes a first passage for a variable length data having at least one collection of data obtained by performing a variable length encoding for every block of encoding unit on the input data, header information associated with the variable length data and a sub-macro block length data for indicating the length of the sub-macro block itself, a second passage for an adjustment bit data and a length data indicating the length of the adjustment bit data itself, and a third passage for a correction directing signal, thus for transmitting a data for selecting at least one of the three passages by embedding the selecting data in a coefficient based on an encoding characteristics of the variable length data.

6 Claims, 21 Drawing Sheets

FIG. 3
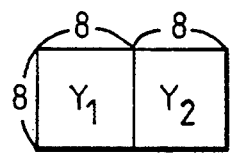
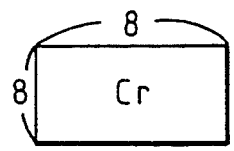
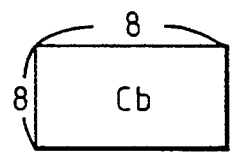
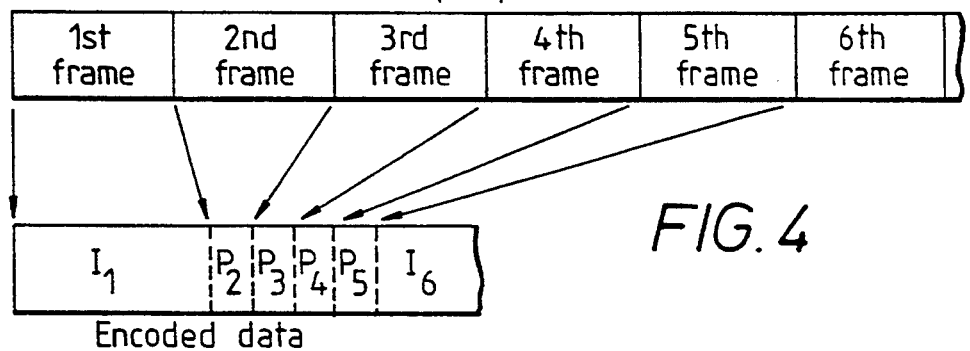
FIG. 4
FIG. 12
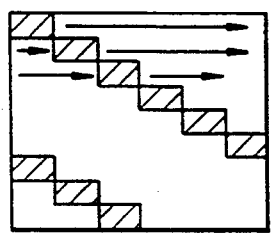
FIG. 13
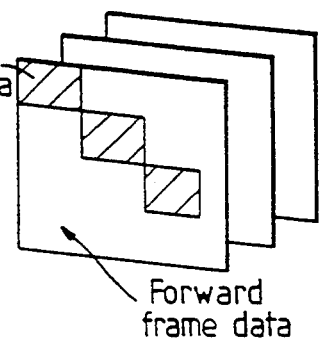
FIG. 14
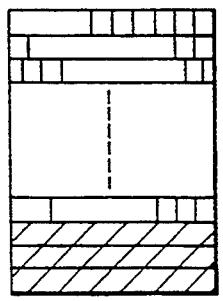

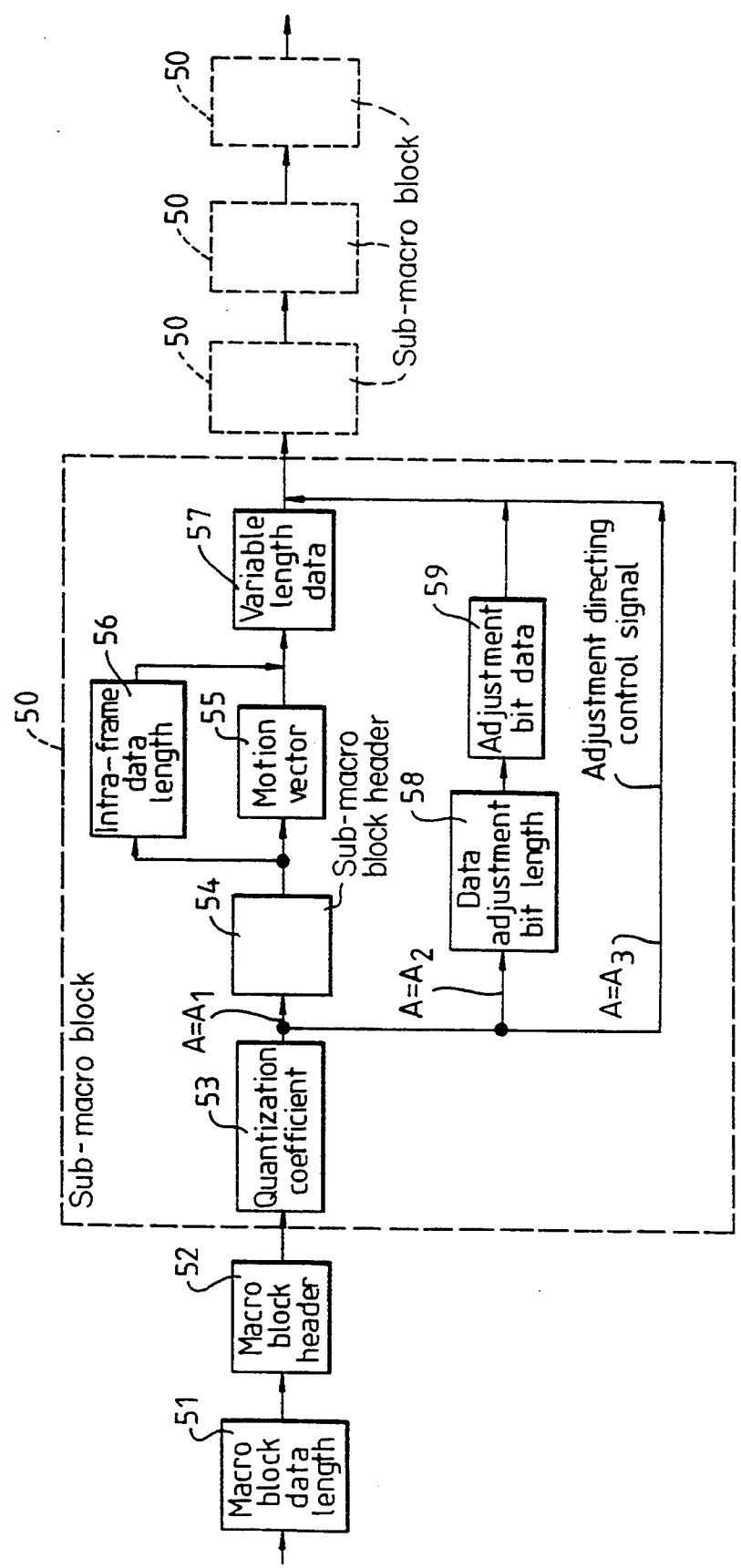

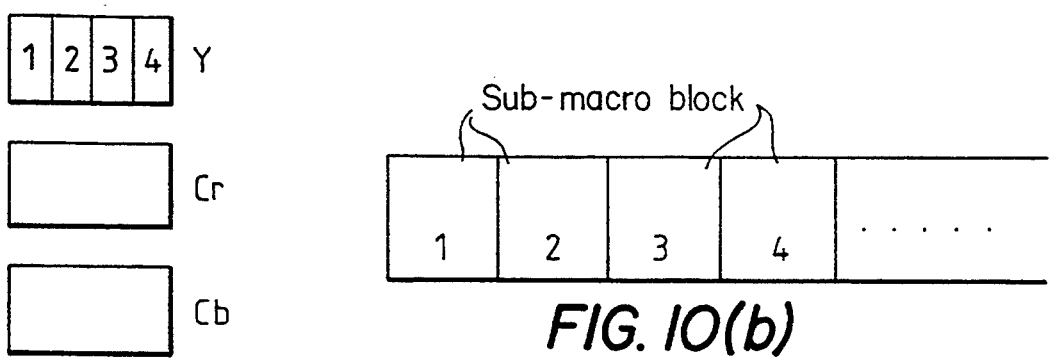
FIG. 10(a)
FIG. 10(b)
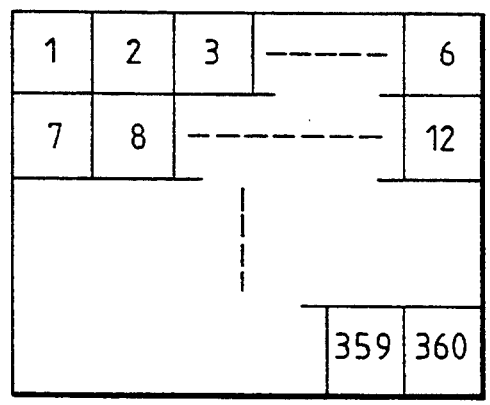
FIG. 10(c)
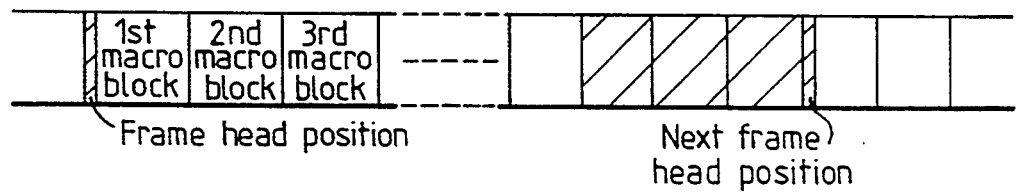
FIG. 15
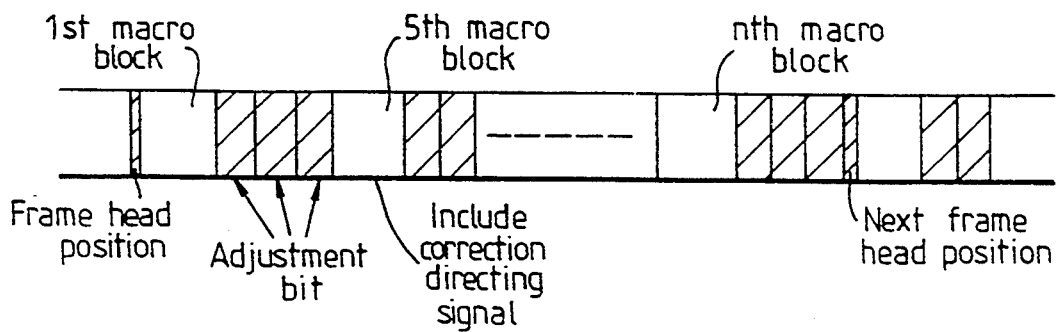
FIG. 16

| SYNC | | | | | | | |
|---|---|---|---|---|---|---|---|
| | ID | On-screen position of macro block 1 | l1 | | | 1-A | Macro block 1 |
| | ID | On-screen position of macro block 3 | l3 | Macro block 2 | | 3-A | Macro block 3 |
| | ID | On-screen position of macro block 4 | l4 | | 4-A | Macro block 4 | |

HIGH EFFICIENT ENCODING/DECODING SYSTEM

FIELD OF THE INVENTION

The present invention relates generally to a high efficient encoding/decoding system, and more particularly, to a high efficient encoding/decoding system suited for recording and playbacking on TV broadcasting and on recording media.

BACKGROUND OF THE INVENTION

Various proposals have been made in recent years for the standaridazation of high effcent encoding for compressing video data. The high efficient encoding technique is to encode video data at a lower bit rate for improving the efficiency of digital transmission and recording. For instance, the CCITT (Comite Consultatif International Telegraphique et Telephonique or International Telegraph and Telephone Consultative Committee) has issued a recommendation for videoconference/video-telephone standardization H.261. According to the CCITT recommendation, the encoding is made using the intra-frame compression processed frame I and the inter-frame compression processed for the predictive frame compression processed frame p.

Referring now to FIG. 1, the video data compression standard according to the CCITT Recommendation will be explained.

The intra-frame compression processed frame I is one frame of video data encoded by the DCT (Discrete Cosine Transform) processing. The inter-frame compression processed frame P is the video data encoded by the predictive encoding using the intra-frame compression processed frame I or the inter-frame compression processed frame P. In addition, a further reduction of bit rate has been made by these encoded data to the encoded in variable length code data. As the intra-frame compression processed frame I was encoded by the intra-frame information only, it is possible to decode the intra-frame compression processed frame I by single encoded data only. The inter-frame compression processed frame P was encoded by correlations to other video data, thus the inter-frame compression processed frame P cannot be decoded by single encoded data only.

FIG. 2 is a block diagram showing the recording section of a conventional recording/playback apparatus using such a predictive encoding.

The luminance signal Y and color difference signals Cr and Cb are applied to a multiplexer 11, where they are multiplexed in a block of 8 columns and 8 rows (or 8×8 block). The rate of the color difference signals Cr in the horizontal direction is ½ of the luminance signal Y. Therefore, in the period when two 8×8 luminance (Y) blocks are sampled, one 8×8 block of the color difference signals Cr and Cb is sampled. As shown in FIG. 3, four blocks in total forms a macro block (MB). Here, two luminance signal blocks Y and each of the color difference signal blocks Cr and Cb represent the same position on the picture frame. Further, a plurality of macro blocks define a GOB (group of block) and a plurality of GOBs define one frame. The output of the multiplexer 11 is applied to a DCT unit 13 through a subtractor 12.

When performing the intra-frame compression, a switch 14 is kept OFF and the output of the multiplexer 11 is applied directly to the DCT unit 13 as described later. A signal block of 8×8 pixels is applied to the DCT unit 13. The DCT unit 13 converts the input signal into frequency components through the 8×8 two dimensional DCT processing. This makes it possible to reduce the spatial correlative components. The output of the DCT unit 13 is applied to a quantizer 15 which lowers one block signal redundancy by requantizing the DCT output using a fixed quantization coefficient. Further, block pulses are supplied to the multiplexer 11, the DCT unit 13, the quantizer 15, etc which operate in unit of block.

The quantized data from the quantizer 15 is applied to a variable length encoder 16 and is, for instance, encoded to the Huffman codes based on the result calculated from the statistical code amount of the quantized output. As a result, a short time sequence of bits is assigned to data having a high appearance probability and a long time sequence of bits to data having a low appearance probability and thus, the transmission amount is further reduced. The output of the variable length encoder 16 is applied to a error correcting encoder 17, which provides the output from the variable length encoder 16 with an error correcting parity added to a multiplexer 19.

The output of the variable length encoder 16 is also applied to an encoding controller 18. The amount of the output data varies largely depending on input picture signal. So, the encoding controller 18 monitors the amount of output data from the variable length encoder 16 and adjusts the amount of the output data by controlling the quantization coefficient of the quantizer 15. Further, the encoding controller 18 may restrict amount of the output data by controlling the variable length encoder 16.

A sync/ID generator 20 generates a frame sync signal and an ID signal representing data contents and additional information and provides them to the multiplexer 19. The multiplexer 19 forms one sync block data with a sync signal, an ID signal, a compressed signal data and a parity and provides these data to a recording encoder (not shown). The recording encoder, after recording/encoding the output from the multiplexer 19 according to charactersitic of a recording medium, records the encoded data on a recording medium (not shown).

If the switch 14 is ON, the current frame signal from the multiplexer 11 is subtracted from the motion compensated preceding frame data, which will be described later, in the subtracter 12 and applied to the DCT unit 13. In this case the inter-frame encoding is carried out to encode differential data using a redundancy of the inter-frame picture. When a difference between the preceding frame and the current frame is merely obtained, it will become large if there is any motion in the picture. So, the difference is made small by compensating for the motion by obtaining a difference at the pixel position corresponding to the motion vector while detecting the motion vector by obtaining the position of the preceding frame corresponding to the prescribed position of the current frame.

That is, the output of the quantizer 15 is also applied to an inverse quantizer 21. This quantized output is inverse quantized in the inverse quantizer 21 and further, inverse DCT processed in an inverse DCT unit 22 and restored to the original video signal. Further, the original information cannot be reconstructed completely in the DCT processing, requantization, inverse quantization and inverse DCT processing and part of the information lacks. In this case, as the output of the subtracter 12 is a differential information, the output of the inverse DCT unit 22 is also a differential information. The output of the inverse DCT unit 22 is applied to an adder 23. The output from the adder 23 is fed back through a variable delay unit 24 which delays signals by about one frame period and a motion compensator 25, and the adder 23 reproduces the current frame data by adding differential data to the preceding frame data and provides them to the variable delay unit 24.

The preceding frame data from the variable delay unit 24 and the current frame data from the multiplexer 11 are applied to a motion detector 16 where a motion vector is detected. The motion detector 26 obtains a motion vector through a full search motion detection by, for instance, a matching calculation. In the full search type motion detection, the current frame is divided into the prescribed number of blocks and the search range of, for instance, a 15×8 pixels block is set for each block. In the search range corresponding to the preceding frame, the matching calculation is carried out for each block and an inter-pattern approximation is calculated. Then, by calculating the preceding frame block which provides the minimum distortion in the search range, the vector which is obtained by the preceding frame block and the current frame block is detected as the motion vector. The motion detector 26 provides the motion vector thus obtained to the motion compensator 25.

The motion compensator 25 extracts a corresponding block data from the variable delay unit 24, compensates it according to the motion vector and provides it to the subtracter 12 through the switch 14 and also, to the adder 23 after making the time adjustment. Thus, the motion compensated preceding frame data is supplied from the motion compensator 25 to the subtracter 12 through the switch 14. When the switch 14 is ON, the inter-frame compression mode results. While if the switch 14 is OFF, the intra-frame compression mode results.

The switch 14 is turned ON/OFF based on a motion signal. That is, the motion detector 26 generates the motion signal depending on whether the motion vector size exceeds over a prescribed threshold value and applies it to a logic unit 27. The logic unit 27 controls the ON/OFF of the switch 14 by the logical judgement using the motion signal and a refresh periodic signal. The refresh periodic signal is a signal representing the intra-frame compression processed frame I, as shown in FIG. 1. If the input of the intra-frame compression processed frame I is represented by the refresh periodic signal, the logic unit 27 turns OFF the switch 14 irrespective of the motion signal. Further, if the motion signal represents that the motion is relatively fast and the minimum distortion by the matching calculation exceeds the threshold value, the logic unit 27 turns OFF the switch 14. Thus the intra-frame compression encoding is carried out for each block even when the inter-frame compression processed frame P data are input. TABLE 1, as shown below, represents the ON/OFF control of the switch 14 by the logic unit 27.

TABLE 1

| Frame I | Intraframe Compression Processed Frame | Switch 14 OFF |
|---|---|---|
| Frame P | Motion Vector Detected Inter-frame Compression Processed Frame | Switch 14 ON |
|  | Motion Vector Unknown | Switch 14 OFF |

TABLE 1-continued

Inter-Frame Compression Processed Frame

FIG. 4 is an explanatory diagram showing the data stream of record signals which are output from the multiplexer 19.

As shown in FIG. 4, the first and the sixth frames of the input video signal are converted into intra-frame compression processed frames 11 and 16, respectively. While the second through the fifth frames are converted into inter-frames compression processed frames P1 through P5. The ratio of the data amount between the intra-frame compression processed frame I and the inter-frame compression processed frame P is (3–10); 1. The amount of data of the intra-frame compression processed frame I is relatively large, while the amount of data of the inter-frame compression processed frame P is extremely reduced. Further, the data of the inter-frame compression processed frame P cannot be decoded unless other frame data are decoded.

FIG. 5 is a block diagram illustrating the decoding section (playback section) of a recording/playback apparatus.

Compressed encoded data recorded on a recording medium is playbacked through a playback head (not shown) and then applied into an error correction decoder 31. The error correction decoder 31 corrects errors occurring in a data transmission and data recording. The playbacked data from the error correction decoder 31 through a code buffer memory 32 and decoder to prescribed length data. Further, the code buffer memory 32 may be omitted.

The output of the variable length decoder 33 is processed by an inverse-quantization in an inverse quantizer 34, and then decoded and restored to the original video signal by an inverse-DCT operation in an inverse DCT unit 35. The restored signal is applied to the terminal a of a switch 36. The output of the variable length decoder 33 is also applied to a header signal extractor 37. The header signal extractor 37 retrieves a header for determining whether the input data is the intra-frame compression data (intra-frame data) or the inter-frame compression data (inter-frame data) and then provides the header to the switch 36. When applied with the header representing the intra-frame compression data, the switch 36 selects the terminal a of the switch 36 and outputs the decoded data from the inverse DCT unit 35.

The inter-frame compression data is obtained by adding together the output from the inverse DCT unit 35 and the preceding frame output from a predictive decoder 39 using an adder 38. That is, the output of the variable length decoder 33 is applied to a motion vector extractor 40 for obtaining the motion vector. The motion vector is then applied to the predictive decoder 39. The decoded output from the switch 36 is delayed for one frame period by a frame memory 41. The predictive decoder 39 compensates the preceding decoded data from the frame memory 41 according to the motion vector and provides them to the adder 38. The adder 38 applies inter-frame compression data to the terminal b of the switch 36 by adding the output from the predictive decoder 39 and the output from the inverse DCT unit 35 together. When the inter-frame compression data is applied, the switch 36 selects the terminal b by the header and outputs the decoded data from the adder 38. Thus, the compression and the expansion of data are carried out without delay in both of the intra-frame compression mode and the inter-frame compression mode.

Various systems for recording such high efficient encoded digital video data on a magnetic video cassette recorder (VCR) have been developed. FIG. 6 is an explanatory diagram for explaining the recording tracks produced on a recording medium by this VCR.

In FIG. 6, A1, A2, ... etc., represent the recording tracks by a plus-azimuth head, while B1, B2, ... etc., represent the recording tracks by a minus-azimuth head. In this case, there is normally no problem especially in the playback operation. However, when the triple-speed mode playback is performed, the trace patterns by the heads are as illustrated by the arrow in FIG. 6 and only the hatched section where the head azimuth agrees with the azimuth of the recording track is play-backed. Even in this case, one picture can be play-backed during an analog recording operation where an on-screen position and the recorded position on a recording medium correspond to each other. However, the intra-frame compression processed frame I and the inter-frame compression processed frame P differ each other in their encoded amounts. If the data stream, as shown in FIG. 4, is recorded on a recording medium, one frame is not necessarily reconstructed from the playbaced data at the triple-speed mode playback. Further, the inter-frame compression processed frame P will not be able to be played back when any undecoded frame is generated as in the triple-speed mode playback, because the inter-frame compression processed frame P cannot be decoded as an independent frame. Furthermore, as data are playbacked discontinuously in this case, data after an interruption occurred cannot be used efficiently in a system for decoding an input data train continuously such as a video telephone, etc.

So, in order to make data correspond to positions on the picture screen, it is known to add block address information. However, undesired data other than video data may be added, thus lowering a data utilization coefficient. Further, it is also known to record data on a recording medium with address information added in correspondence with the on-screen position at the receiving section or to reconstruct intra-frame compression data by changing the format to fit to the memory. But data required for executing the format transformation is not transmitted. Furthermore, an effective decode using discontinuous playbacked data is not performed.

Further, in the Japanese Patent Application (TOKU-GAN-HEI) PO3-330650, the applicant of the present application has proposed "Variable Length Code Recording/Reproducing Apparatus" for format transformation and recording in a VTR without decoding received broadcasting signals. Furthermore, the applicant of the present application has also proposed "Transmission System" for adjusting data length and adding a skip code in consideration of a trick play operation of VCRs in the Japanese Patent Application (TOKU-GAN-HEI) PO4-067610.

Here an MPEG (Moving Picture Experts Group) Standard 1 has been proposed as a compression technique of a moving picture in a field of storage media. This MPEG Standard is adapted for semi-moving pictures at a transmission rate of 1.2 Mbps. The MPEG Standard is adapted for a CD-ROM, etc. FIG. 7 is an explanatory diagram showing the data structure of the MPEG Standard.

As illustrated in FIG. 7, the data structure of the MPEG system is hierarchical and a start code has been added to all the layers with the exception of the macro block layer. The lowest block layer is constructed with the $8 \times 8$ pixels block. The size of one pixel (one block) differs between the luminance component and the color difference component, as their sampling periods are different from each other. If a sampling ratio of the luminance component and the color difference component is 4:1, four luminance blocks correspond to one color difference block. For this reason, the macro block layer (corresponding to the small block in the "High Efficient Encoding/Decoding System") is constructed with a header added to two blocks each, total four blocks Y0 through Y3 and two blocks of color difference signals Cr and Cb in the column and row directions of the luminance component.

A slice layer (corresponding to the macro block in the "High Efficient Encoding/decoding System") composed of one or more macro blocks is formed by predictive encoding in the unit of this macro block, and one frame picture layer is formed by N pieces of the slice layer. Two-directional predictions, backward predictions, forward predictions or intra-picture predictions may be adopted for the predictive encoding of macro block. A GOP layer is constructed by several frame of picture layers. The GOP layer is constructed by bidirectional predictive frames (B pictures), forward predictive frames (P pictures) and intra-frame predictive frames (I pictures). For instance, if a prescribed frame is an I picture, all macro blocks are encoded for the slice layer using the intra-frame prediction. Further, in the case of a P picture frame, the macro blocks are encoded in the slice layer using the forward prediction or the intra-frame prediction. In the case of a B picture frame, the macro blocks are encoded using any one of the intra-frame prediction, the forward prediction and the backward prediction or both of the forward and the backward predictions. A video sequence layer is formed by a plurality of GOPs. Further, each of the headers of the video sequence layer, the GOP layer, the picture layer and the slice layer has a start code indicating the start of each layer, while the header of the macro block layer has a macro block address.

In the "High Efficient Encoding/Decoding System", a system including a macro block data length in a data string has been considered. However, in the MPEG system, no slice layer data length equivalent to this macro block data length exists. Further, if a quantization coefficient of the MPEG system is directly used, the conditional branch in the "High Efficient Encoding/decoding" can be achieved but no rule governing this is available at present. For these reasons, when considering an application to the MPEG system, there is a problem that it is difficult to handle them equally at detailed points although they are the same in principle.

Thus, in the conventional high efficient encoding/decoding system described above, there was a problem that the data utilization coefficient is lowered if address information is added to data at a data transmitting section. Further, there was another problem that data required for the format transformation was not transmitted to a data receiving section and, in addition, there was a problem that the decoding operation can not efficiently use the transmitted data when the data were transmitted in a discontinous fashion.

Further, there was another problem that it was difficult to apply the MPEG system on the existing high efficient encoding/decoding system.

SUMMARY OF THE INVENTION

It is, therefore, a first object of the present invention to provide a high efficient encoding/decoding system which is capable of facilitating the format transformation, capable of enabling the decoder to effectively use discontinuous data, and also capable of suppressing an error propagation without lowering the data utilization coefficient at a data receiving section.

A second object of the present invention is to provide a high efficient encoding/decoding system which, in absent of macro block data length information or in case of not executing a passage based on a quantization coefficient, is capable of facilitating the format transformation at a data receiving section, capable of enabling the decoding operation to effectively use discontinuous data, and furthermore, capable of suppressing an error propagation without deteriorating data utilization coefficient.

In order to achieve the above object, a high efficient encoding/decoding system according to one aspect of the present invention in which the system is provided with a sub-macro block comprising at least one collection of blocks as an encoding unit of input data, a macro block comprising a macro block length data for indicating the length of the macro block itself in its head position and at least one of the sub-macro blocks. The sub-macro block has a variable length data comprising at least one collection of data obtained by performing a variable length encoding for every block of encoding unit on the input data, header information associated with the variable length data and a sub-macro block length data for indicating the length of the small block itself as a first passage, an adjustment bit data and a length data indicating the length of the adjustment bit data itself as a second passage, and a correction directing signal as a third passage, thus for transmitting a data for selecting at least one of the three passages by embedding the selecting data in a coefficient based on an encoding characteristics of the variable length data. The system is further provided with an encoder for transmitting data after processed the variable length encoding for every block of encoding unit on the input data, a data length measuring unit for measuring and outputting the data length from the variable length encoder, a header information generator for generating and outputting header information for the output of the encoder, a first packeting unit for performing at least one of operations for packeting the outputs of the encoder, the data length measuring unit and the header information generator as to the first passage, and for packeting a predetermined adjustment bit data and the length data indicating the length of the adjustment bit data itself as to the second passage, and for packeting the the correction directing signal as to the third passage system, and a second packeting unit for packeting and outputting the outputs of the data length measuring unit and the header information generator into the output of the first packeting unit, by constituting a macro block containing at least one of the sub-macro blocks.

According to a second aspect of the present invention, the high efficient encoding/decoding system is provided with a small block comprising at least one collection of blocks as an encoding unit of input data, a macro block comprising a macro block length data for indicating the length of the macro block itself in its head position and at least one of the small blocks. The sub-macro block has a variable length data comprising at least one collection of data obtained by performing a variable length encoding for every block of encoding unit on the input data, header information associated with the variable length data and a sub-macro block length data for indicating the length of the sub-macro block itself in case of performing the intra-frame coding as a first passage, an adjustment bit data as a second passage, and a correction directing signal as a third passage, thus for transmitting a data for selecting at least one of the three passages by embedding the selecting data in a coefficient based on an encoding characteristics of the variable length data. The system is further provided with an encoder for transmitting data after processed the variable length encoding for every block of encoding unit on the input data, a data length measuring unit for measuring and outputting the data length from the variable length encoder, a header information generator for generating and outputting header information for the output of the encoder, a first packeting unit for performing at least one of operations for packeting the outputs of the encoder, the data length measuring unit and the header information generator as to the first passage, and for allocating a predetermined adjustment bit data as to the second passage, and for packeting the the correction directing signal as to the third passage system, and a second packeting unit for packeting and outputting a special code for indicating data of a macro block and the output of the header information generator into the output of the first packeting unit, by constituting the macro block containing at least one of the sub-macro blocks.

The high efficient encoding/decoding system according to the second aspect of the present invention can include a recording system adapted for receiving an input signal which contains in every frame at least one macro block comprising at least one small block containing at least one encoding unit block and a special code allocated on the head position of the macro block it self for indicating the data position of the macro block. The recording system is provided with a detector for detecting the macro block on the head position of a picture screen, an address generator for generating an address corresponding to at least one of screen positions of the respective macro blocks and the respective sub-macro blocks, and a packeting unit for packeting the address from the address generator and the information of the head position of the picture screen in the macro blocks with the input signal.

The high efficient encoding/decoding system according to the second aspect of the present invention can include a reproducing system adapted for reproducing recorded signals. The reproducing system is provided with an extractor for exclusively extracting intra-frame compression data from the reproduced signal, a reconstructing unit capable of reconstructing the intra-frame compression data at a prescribed time unit, a first adder for adding a skip flag to the output of the reconstructing unit at a timing other than that of the intra-frame compression data, and a second adder capable of adding an adjusting bit for adjusting data length to the output of the reconstructing unit.

According to the high efficient encoding/decoding system of the first aspect of the present invention, if the first passage of the small block is selected, it is possible to indicate the size of data block which is independently decodable by the sub-macro block length data for intra-frame compression data, thus making the format transformation easy at a recording on a recording medium. While if the second passage is selected, adjustment bits are transmitted in place of the variable length data, thus making a time adjustment be carried out. If the third passage is selected, a correction directing signal is transmitted, and thus it becomes possible to correct data even when data are discontinuously reconstructed.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an explanatory diagram showing the construction of a macro block in an example of the conventional system;

FIG. 4 is an explanatory diagram showing a data stream of recording signals;

FIG. 8 is an explanatory diagram showing the first embodiment of the high efficient encoding/decoding system;

FIGS. 10(a)–10(c) are explanatory diagrams for explaining the data construction technique shown in FIG. 8;

FIG. 12 is an explanatory diagram for explaining the MPEG system syntax;

FIG. 13 is a block diagram showing one example of an encoder;

FIG. 14 is a block diagram showing one example of a decoder;

FIG. 15 is a block diagram showing the second embodiment of the present invention;

FIG. 16 is an explanatory diagram for explaining the operation of the embodiment shown in FIG. 8;

DESCRIPTION OF THE PREFERRED EMBODIMENT

A first embodiment of the present invention will be described hereinafter with reference to the drawings. FIG. 8 is an explanatory diagram showing the first embodiment of the high efficient encoding/decoding system of the present invention. FIG. 8 is a diagram showing a construction of encoded data. FIGS. 9(a)–9(d) and 10(a)–10(c) explanatory diagrams for explaining the technique for constructing the encoded data, as shown in FIG. 8.

Referring now to FIGS. 9(a)–9(d) and 10(a)–10(c), the construction of the data format used in this embodiment will be explained in detail.

Figure 9A:
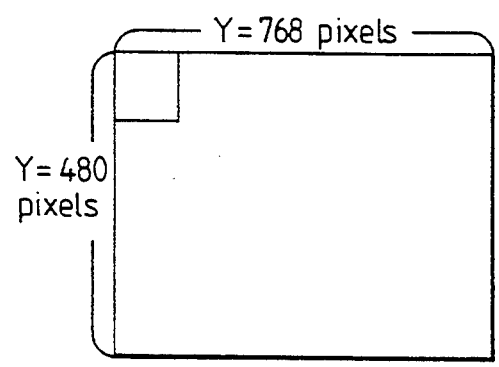
FIGS. 9(a)–9(d) are explanatory diagrams for explaining the data construction technique shown in FIG. 8.
Figure 9B:
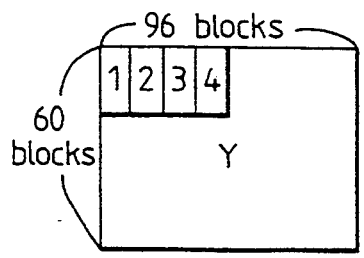
Figure 9C:
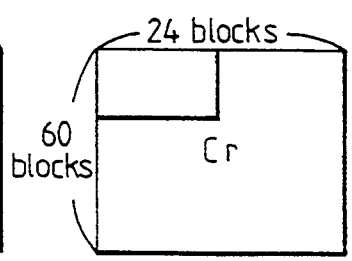
Figure 9D:
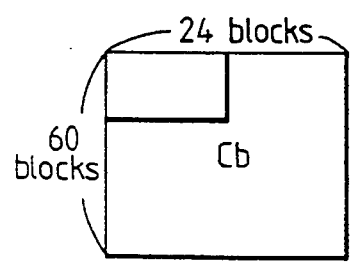
Figure 2:
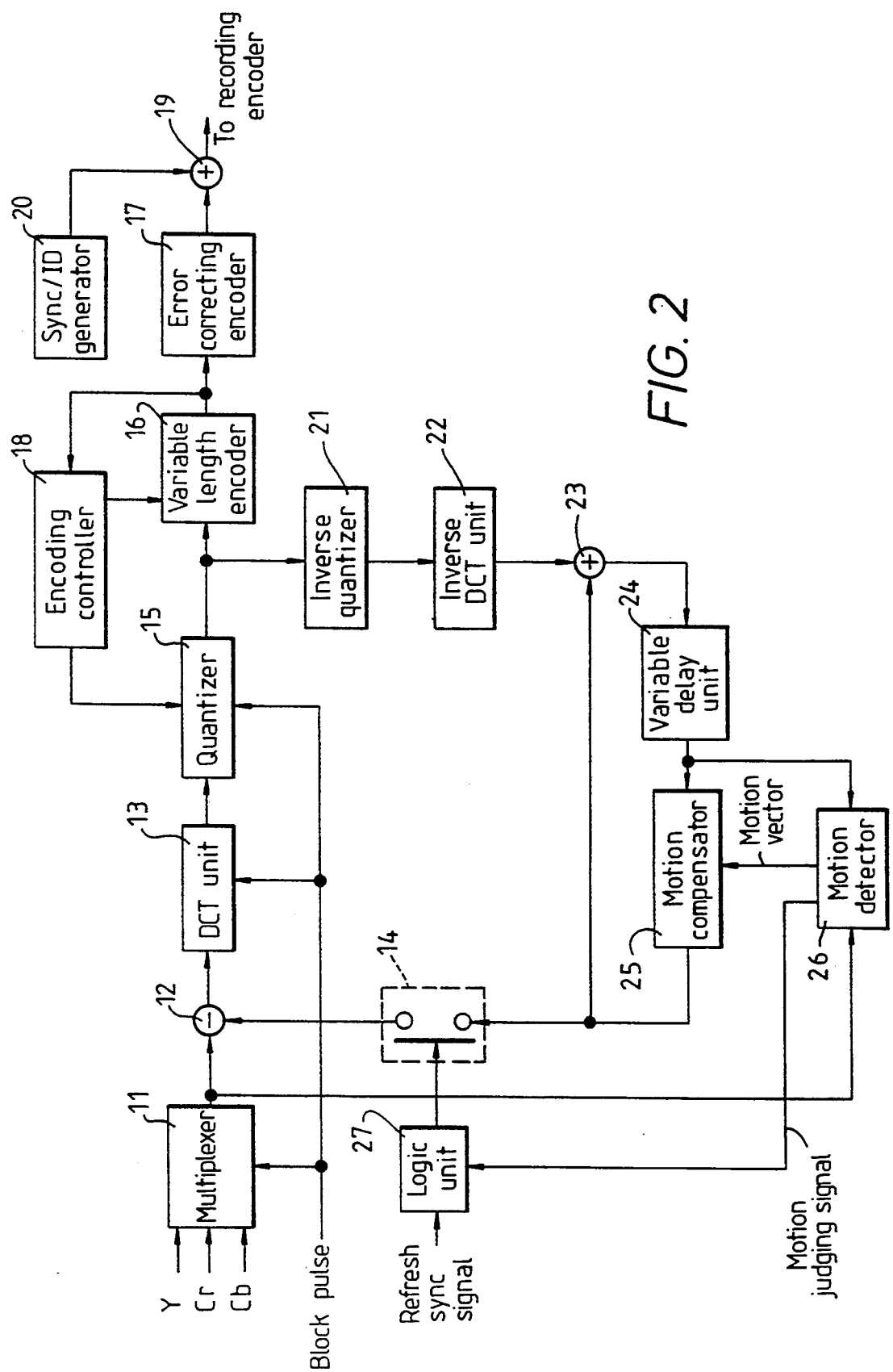
FIG. 2 is a block diagram showing the recording section of the recording/reproducing apparatus adopting the predictive encoding.
Figure 5:
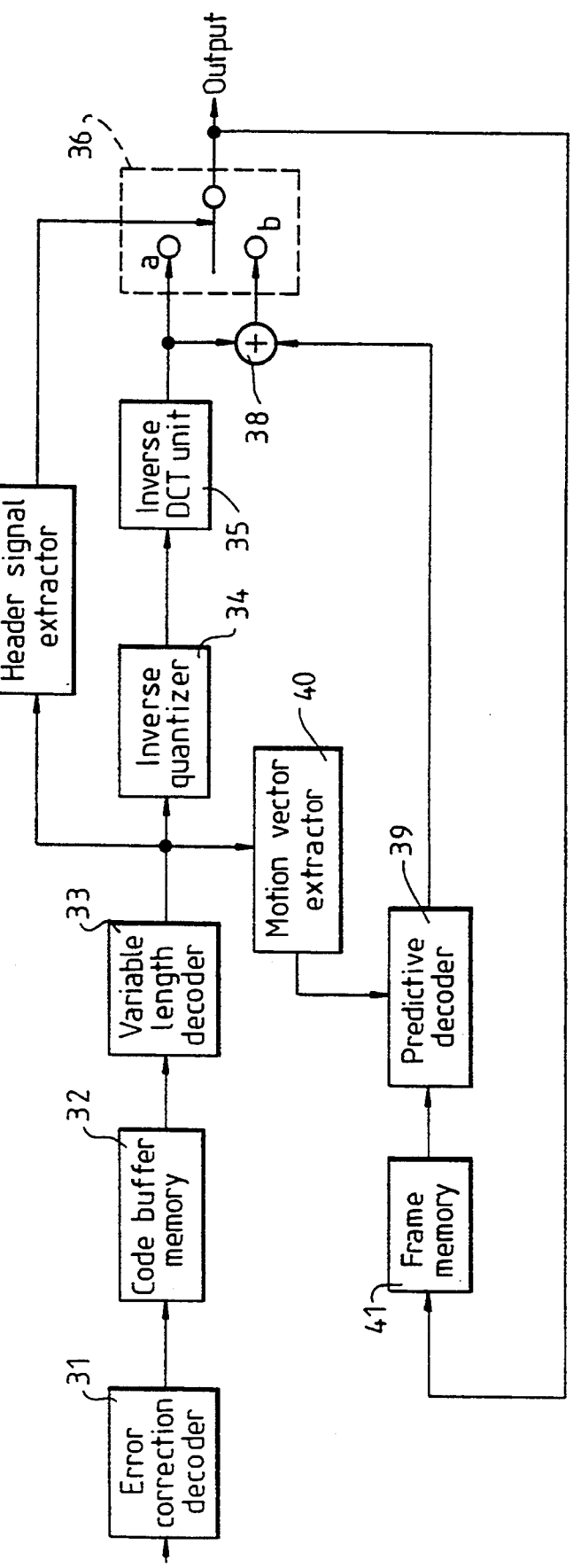
FIG. 5 is a block diagram showing the decoding section (reproducing section) of the recording/reproducing apparatus.
Figure 7:
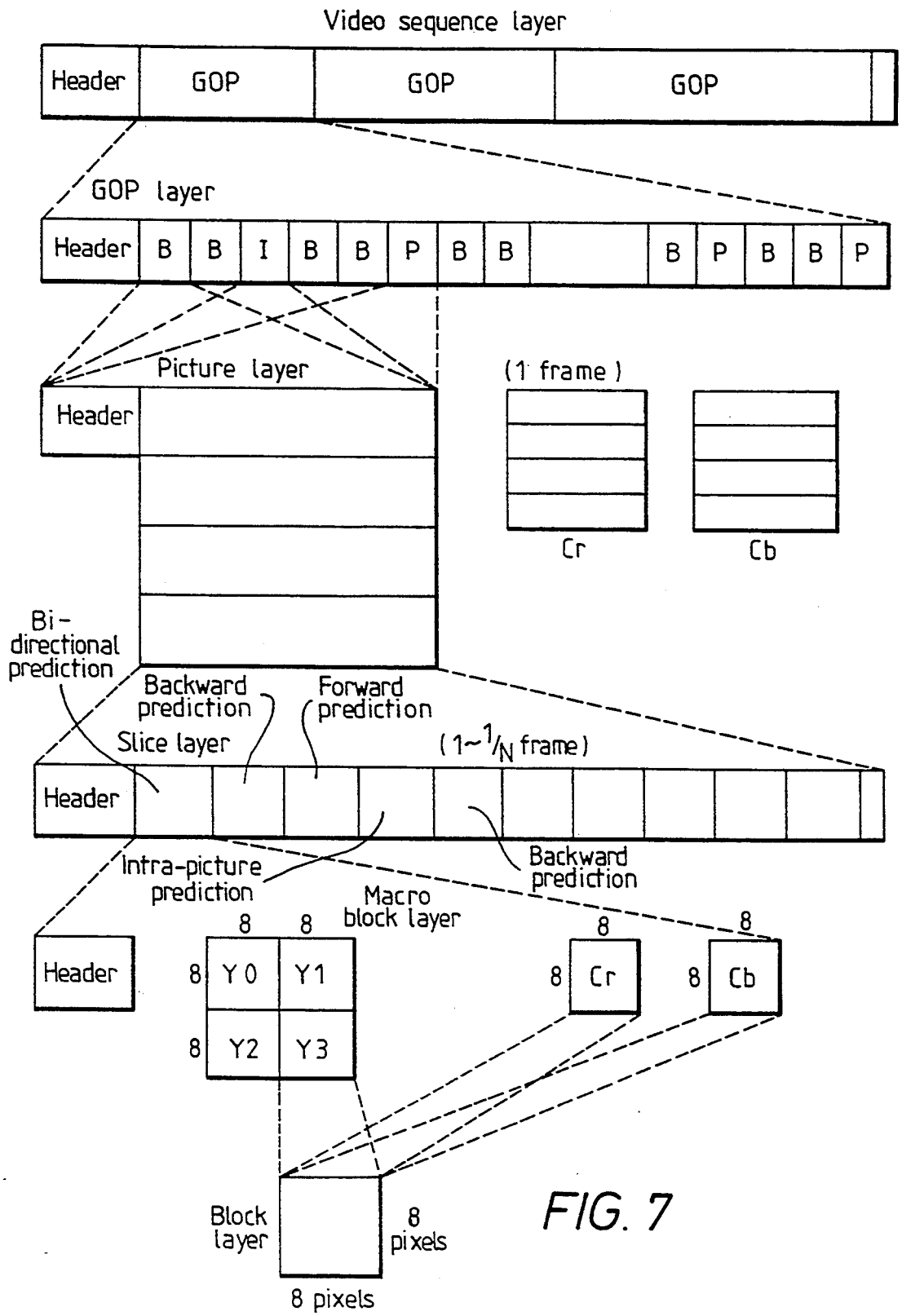
FIG. 7 is an explanatory diagram for explaining the hierarchy of the MPEG system.

As shown in FIG. 9(a), one frame picture is composed of 768×480 pixel blocks in reference to a luminance signal Y as a standard. If one block is composed of the 8×8 pixels block of the luminance signal Y, as shown in FIG. 9(a), the number of luminance signal blocks per one frame picture will be a 96 columns and 60 rows block (96×60 blocks), as shown in FIG. 9(b). If the luminance signal Y and the color difference signals Cr and Cb are sampled at the ratio of sampling frequency 4:1:1, the number of color difference signal blocks per frame picture will be a 24×60 blocks for the color difference signals Cr and Cb, as shown in FIGS. 9(c) and 9(d). That is, the sizes of four luminance signal blocks Y and each of the color difference signals Cr and Cb on the picture are the same and these four luminance signal blocks Y and each of the color difference signals Cr and Cb form a Sub-macro block (see FIG. 10(a)). Here it is noted that the unit of transformation encoding is one block.

Figure 1:
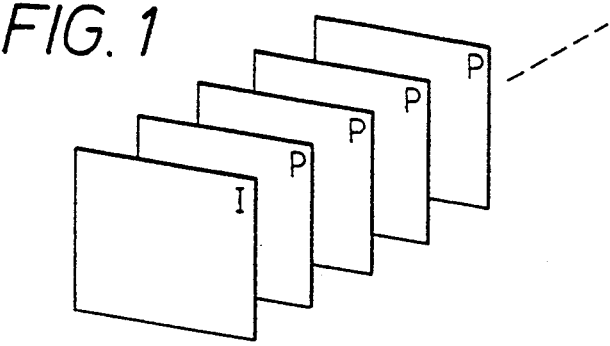
FIG. 1 is an explanatory diagram for explaining the compression technique of the H.261 recommendation.
Figure 6:
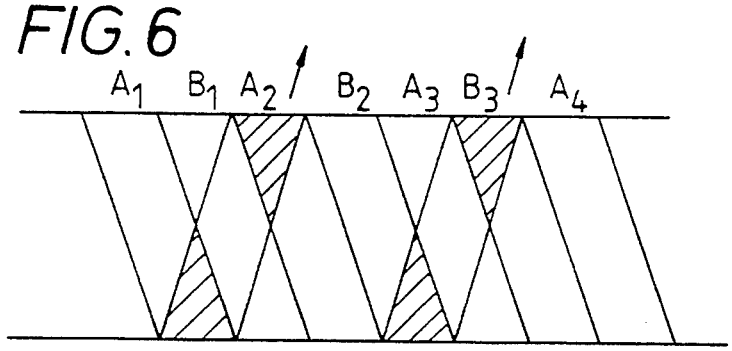
FIG. 6 is an explanatory diagram for explaining the recording tracks formed on a recording medium by a VCR.

Further in the first embodiment of the present invention, a group of four sub-macro blocks forms one macro block (the definition of this macro block differs from the conventional example), as shown in FIG. 10(b). Therefore, one frame is composed of 24 column small blocks and 60 row small blocks (16×60 small blocks), as shown in FIG. 10(c), or 6 column macro blocks and 60 row macro blocks (6×60 macro blocks) when expressed in terms of macro blocks.

Referring now to FIG. 11(a)–11(d) the construction of block data will be explained in detail.

Figure 11A:
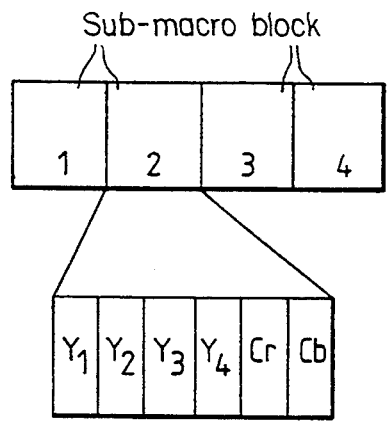
FIGS. 11(a)–11(d) are explanatory diagrams for explaining the construction of block data.
Figure 11B:
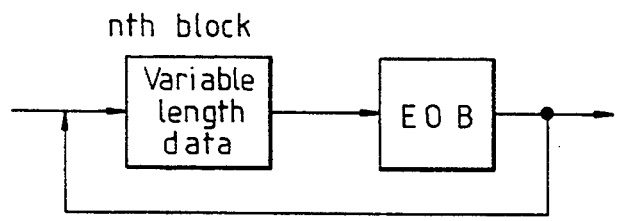
Figure 11C:
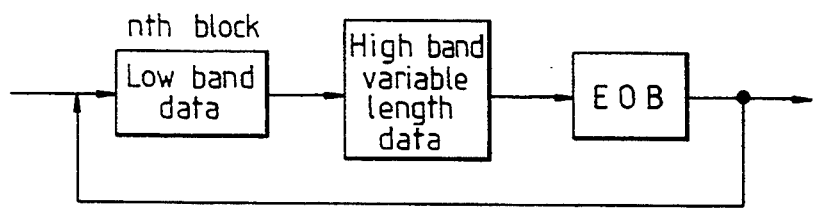

As described above, a small block is composed of 4 luminance blocks Y and each of the color difference blocks Cr and Cb. The luminance blocks Y1, Y2, Y3 Y4 and the color difference blocks Cr and Cb are arranged as shown in FIG. 11(a) and transmitted in the order. FIG. 11(a) shows the construction of the luminance blocks Y and the color difference blocks Cr and Cb in the sub-macro block, and the blocks of Y, Cr and Cb are sequentially described according to the variable length data, as shown in FIG. 11(b). The variable length data is attached with an EOB (End of Block) signal. That is, one sub-macro block is composed of 6 continuous data illustrated in FIG. 11(b). Further, FIG. 11(b) illustrates an example of all compression encoded data sequentially described as variable length data. Compression enoded data may be transmitted by separating them into a low band data and a high band variable length data, as shown in FIG. 11(c).

Figure 11D:
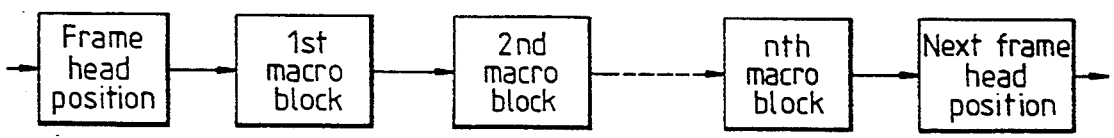

Each macro block (Macro B) composed of four small blocks is transmitted in the order of the sequential number, as shown in FIG. 10(c). That is, as shown in FIG. 11(d), in one frame data for indicating the head position of the frame is allocated at the head position of the frame and then the first, the second, . . . the nth macro block (n=240 in FIG. 10) data are sequentially allocated. Then, data on the head position of the following frame is allocated.

Referring now to FIG. 8, constructions of the macro blocks and the sub-macro blocks will be explained in detail. They are illustrated by a block of a broken line in FIG. 8.

The macro block data length 51 is allocated on the head position of the macro block. A macro block data length 51 represents the data length of each macro block. If an error, etc, occurs in a macro block, the head position of the next macro block can be known using the information of macro block data length 51. This prevents the error occurring in a macro block from affecting other macro blocks.

Then, the macro block header 52 is allocated. The macro block header 52 represents in uniform fashion the entire information on the entire macro blocks such as information of its positional correspondence with a picture screen, or information for determining whether the entire macro blocks are intra-frame compression data or inter-frame compression data, etc. Four small blocks 50 are allocated following the macro block header 52.

In the sub-macro block 50, the quantization coefficient 53 is allocated on its head position. In the high efficient encoding, data are quantized after the DCT transformation. The quantization coefficient is for generating a quantization table which is used in this quantization processing. For instance, the quantization table is obtained by multiplying each data quantization coefficient of the quantization table. In this embodiment, the quantization coefficient 53 has the same meaning as the original quantization coefficient, and also functions as a control signal for routing data into three passages which will be described later. For instance, the original quantization coefficient is expressed by 0 through 29 (=A1) using five bit information (0 through 31) as a value A of the quantization coefficient 53. If the value A of the quantization coefficient is A1, it is routed to the sub-macro block header 54 in a first passage. If the value A is 30 (=A2), it is routed to the data adjustment bit length 58 in a second passage. Further, if the value A is 31 (=A3), it is routed to a third passage for directing correction.

Further, in the normal transmission from a broadcasting station, the passage of A=A2 or A=A3 is scarcely performed. The passage of A=A2 or A=A3 is performed mainly on recording media such as VCR, etc.

In the first passage of A=A1, the sub-macro block header 54 is allocated on its head position. The sub-macro block header 54 describes the header of the sub-macro block 50. This sub-macro block header 54 makes it possible to discriminate whether the compression is the intra-frame compression or the inter-frame compression. Further, the sub-macro block header 54 contains other necessary information on the sub-macro block 50. Next to the sub-macro block header 54, the data are routed either to the motion vector 55 or the intra-frame data length 56. The intra-frame data length 56 indicates the data length of the sub-macro block 50 if the sub-macro block 50 is intra-frame compression data. As the intra-frame data can be independently decoded as described above, the reconstruction efficiency in a trick play operation is promoted by reconstructing the intra-frame data in VCR, etc. That is, according to information of the intra-frame data length 56, the data format transformation to such a recording medium can be executed relatively easily. If the sub-macro block 50 is the inter-frame compression data, the data is routed from the sub-macro block header 54 to the motion vector 55. The motion vector 55 provides a vector for indicating the position of the preceding frame pixel which becomes the standard of the inter-frame compression frame (the motion vector).

The variable length data 57 is then allocated following the intra-frame data length 56 or the motion vector 55. The variable length data 57 is obtained by, for instance, quantizing the DCT transformation coefficient and encoding the quantized output, which is read through a zigzag tracing, to the Huffman codes (variable length encoding) according to its generating probability.

In the second passage of A=A2, the data adjustment bit length 58 is allocated following a quantization coefficient 53. This data adjustment bit length 58 represents the adjustment bit length for adjusting the time difference resulting from the difference in encoded amount. For instance, when data for a two-hour program with the signal rate of 200 Mbps is transmitted by compressing the amount of information to 10 Mbps by encoding them with high efficiency, the compression data of the two-hour program are transmitted basically in two hours. However, as data are encoded in variable length, scenes with large amount of information transmitted and those with less amount of information transmitted occur according to a difference in compression ratio for each scene. Therefore, the encoding/decoding system is provided with a buffer. As the time adjustment is made by this buffer, an adjustment bit is scarcely needed. However, in a trick play operation by a VCR, reconstructed data may become discontinuous or only effective data may be playbacked. The time of period equivalent to the discontinuous portion of data cannot be covered by the buffer. For this reason, the second passage for the bit adjustment is provided. The adjustment bit length 58 represents the bit length of the discontinuous portion of the playbacked data. The start position of next playbacked data can be known by the adjustment bit length 58.

Then, the adjustment bit data 59 is allocated. The adjustment bit data 59 is an adjustment bit data which is inserted into the discontinuous data portion by the bit length designated by the data adjustment bit length 58. This adjustment bit data 59 keeps the transmission rate constant. When the second passage of A=A2 is executed, it becomes clear that the transmission data is the adjustment bit; and therefore, the adjustment bit data 59 may be any data. However, when the adjustment bit data is allocated immediately after the variable length data 57 without adding an additional data to the variable length data 57, it is necessary to use a bit train (for instance, all "1" bit train), which does not exist, to the variable length data 57 (encoded to the Huffman codes) as the adjustment bit data 59.

In the third passage of A=A3, only a control signal which directs the correcting operation is transmitted. The decoder is controlled by this control signal and the continuous data portion a corrected by, for instance, the preceding frame data.

As the transmitted data in the construction described above has the macro block length data 51, it is possible to know the head position of next macro block without decoding the variable length data 57. Further, even when an error is generated in a prescribed macro block, the error is completed in that macro block and other macro blocks are not affected by the error. Following this macro block length data 51, next macro block header 52 is transmitted. By comparing with the position on the picture by the macro block header 52, it becomes possible to playback the picture from decoded data even in the trick play operation by a VCR. Further, address information is not transmitted in unit of macro block, thus promoting data utilization coefficient more than a conventional system.

Then, four small blocks 50 are transmitted. Each of the sub-macro block 50 is provided with the quantization coefficient 53 at its head position and in the first passage of A=A1, it is provided with the sub-macro block header 54. Data transmitted from a broadcasting station are in most cases those data composed through the first passage of A=A1. If the small block 50 is intra-frame data, the intra-frame data length 56 is transmitted, while if it is inter-frame data, the motion vector 55 is transmitted. Then, the variable length data 57 is transmitted. Thus, each sub-macro block 50 has the sub-macro block header 54 in addition to the variable length data 57 and the error propagation is restricted. In the trick play operation by a VCR, playbacked data become discontinuous in units of relatively short data. However, each sub-macro block 50 is provided with the sub-macro block header 54 to make unit of decoding small and improve the playback efficiency (decoding efficiency).

By the way, intra-frame data are decodable independently. Therefore, on a VCR, etc., intra-frame data may be reconstructed through the format transformation of transmitted data. In this embodiment, the intra-frame data length is transmitted by the intra-frame data length 56. This makes the format transformation easy on a VCR, etc. Further, it is possible to know that the intra-frame portion is normally playbacked without decoding data and the data end point in the trick play operation by a VCR.

Here, it is assumed the data composed by the first passage of A=A1 are transmitted from a broadcasting station to a VCR where they are transformed into a recording format for the trick play operation in the VCR and are recorded on a recording medium. In this case, the first passage is controlled in the VCR by changing the value A of the quantization coefficient 53. FIGS. 12 and 13 are explanatory diagrams for explaining this operation.

Now, data recorded on the hatched section only are playbacked in the trick play operation by a VCR as shown in FIG. 6. Further, when the playbacked signals of this hatched section are decoded to variable length codes, data which can be restored to the original picture signal using independent data are only intra-frame compression data. On the contrary, in case of inter-frame compression data, differential (predictive) signals only are decoded and therefore, in order to obtain the original picture signals, the preceding frame data are required. Therefore, only the intra-frame compression data out of the playbacked signals are restored to the original picture and other data become unnecessary.

Now, it is assumed that the picture of the hatched section illustrated in FIG. 12 is restored by intra-frame compression data which are playbacked in the trick play operation and the hatched section corresponds to the small blocks. That is, the reconstructed data of each sub-macro block of the first, the 7th, the 21st, . . . macro blocks of the prescribed frame can be decoded. In this case, therefore, data of each sub-macro block of the first, the 7th, the 14th, . . . macro block only are recorded in the VCR. That is, following the data at the head position of the frame (FIG. 11(d)), the first sub-macro block data of the first macro block are stored in the prescribed frame. That is, the value A of the quantization coefficient 53 of the first sub-macro block is A1 and the data transmitted through the first passage of A=A1 are recorded. The value A of the quantization coefficient 53 from the second sub-macro block to the fourth sub-macro block of the first macro block is A3. Similarly, the third passage of A=A3 is selected for all sub-macro blocks of the second macro block through the 15th macro block. In this case, only the control signal directing correction is stored. The first sub-macro block of the 17th macro block selects the third passage of A=A3 and the second small block of the 17th macro block selects the first passage of A=A1. Hereafter, in the similar manner the variable length data for the portion corresponding to the hatched section in FIG. 12 are recorded and the control signal directing correction is recorded for other portions.

When the third passage of A=A3 is selected, the amount of transmission data is decreased. As a result, after transmitting the 240th macro block data, a certain time to spare is produced. So, the second passage of A=A2 is selected by changing the quantization coefficient 53 for time adjustment. FIGS. 14 through 16 are explanatory diagrams for explaining this second passage of A=A2.

FIG. 14 corresponding to one frame data and the hatched section illustrates the adjusting bit by the second passage of A=A2. In FIG. 14, after transmitting the 240th macro block data, the quantization coefficient 53 was set at A=A2. Following the quantization coefficient 53, the data adjustment bit length 58 is transmitted and then, the adjustment bit data 59 are transmitted. The adjustment bit data 59 are inserted for every unit of construction of the data packet and at the same time, the head position of next frame is cleared by the data adjustment bit length 58. FIG. 15 illustrates the data format recorded on a recording medium. In FIGS. 14 and 15, the adjustment bit is transmitted at the last of the frame, however, it may be transmitted by inserting between the macro blocks as shown in FIG. 16.

The intra-frame data, as illustrated by the hatched section in FIG. 13, are decoded and compared with the positions on the screen by the macro block header 52. Further, as to other portions, the control signal directing correction is first playbacked and then the picture is playbacked by using the control signal from the preceding frame data.

Thus, according to the data construction of this embodiment, the frame head position data only are transmitted as address information, promoting data utilization coefficient. Further, the data transmitted are compared with the positions on the screen by the macro block header 52 and the data utilization coefficient can be promoted more than the conventional system. In addition, as the small block, which is unit of decoding, is a combination of a header and variable length codes, the playback efficiency can be promoted when playbacked data are discontinuous. Furthermore, the data length of intra-frame data is transmitted and this will facilitate the format transformation in VCR, etc. Further, the second passage for inserting the adjustment bit for time adjustment and the third passage for directing correction are selected according to the recording state in addition to the first passage for normal data transmission. This makes it possible to restore a picture from playbacked discontinuous data even when playbacked data become discontinuous. Thus, very effective data format is obtained on such recording media with severe condition for compression efficiency in television broadcasting, etc. and generating data errors and discontinuous playback as VCR.

Further, although the construction of encoded data was explained in unit of small block in this embodiment, data may be constructed in unit of block, and the construction, as shown in FIG. 8, may be separated in each independent sub-macro block construction. In this case, the macro block length data 51, the macro block header 52 and the sub-macro block 50 will become a unit of transmission, respectively. Further, the intra-frame data length 56 is not required in this case.

Figure 17:
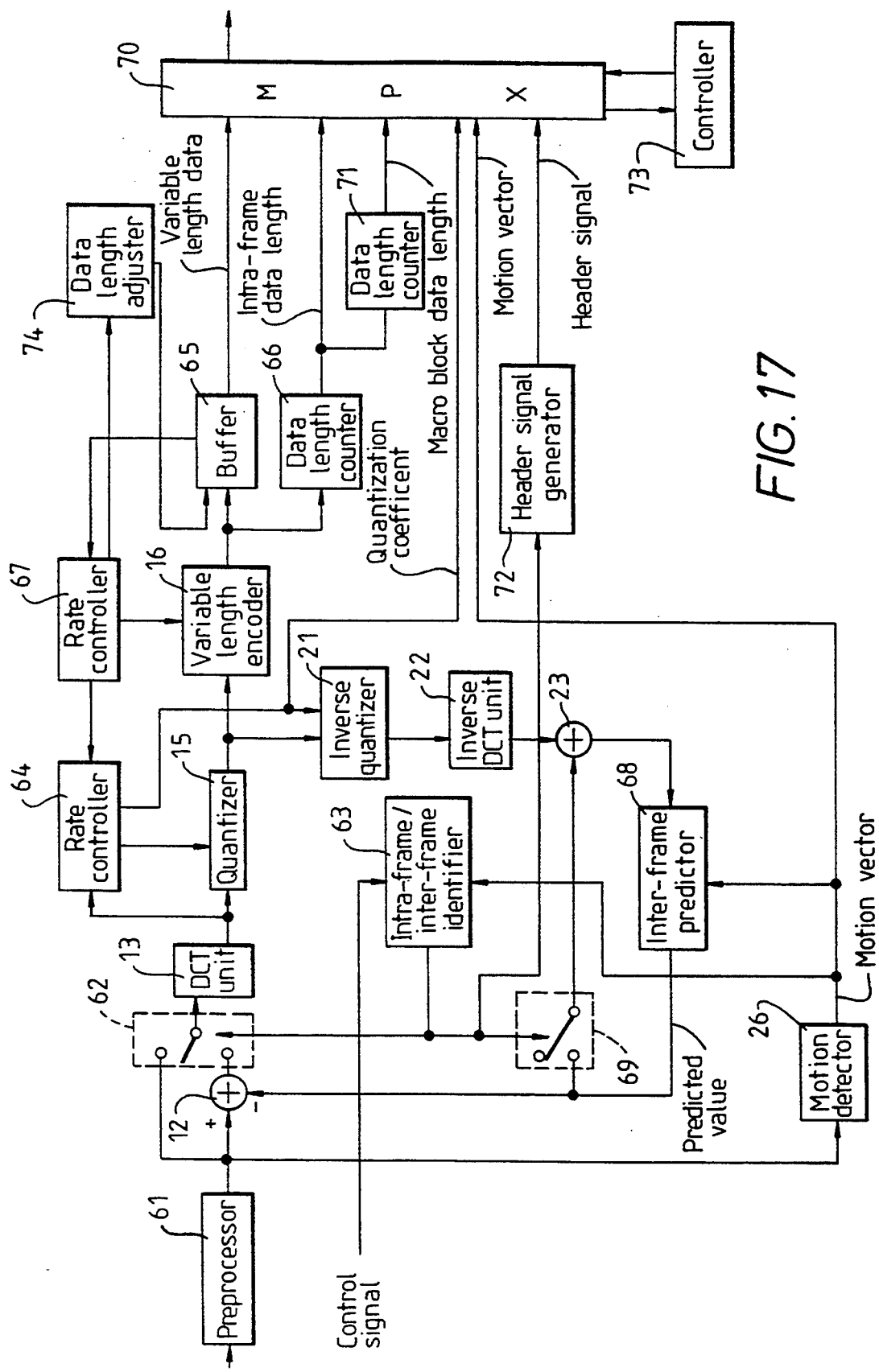
FIG. 17 is an explanatory diagram for explaining the operation of the embodiment shown in FIG. 8.

FIG. 17 is a block diagram showing an encoder for realizing the data construction in FIG. 8.

A preprocessor 61 samples an input signal and applies it, in the unit of sub-macro block as shown in FIGS. 9 and 10, to a subtracter 12 and a switch 62. The switch 62 is supplied with the output from the subtracter 12 and under the control of an intra-frame/inter-frame identifier 63, applies one of two inputs to a DCT unit 13. The intra-frame/inter-frame identifier 63 is supplied with an external control signal and a motion signal from a motion detector 26 which is described later and controls the switch. That is, if the intra-frame compression is directed by the external control signal or if the motion is larger than a prescribed value, the switch 62 is forced by the intra-frame/inter-frame identifier 63 to select the output of the preprocessor 61 for executing the intra-frame compression.

The DCT unit 13 is applied with signals in unit of block and transforms the input signals into frequency components through the 8×8 two dimensional DCT (Digital Cosine Transformation) processing. The output of the DCT unit 13 is applied to a quantizer 15. The quantizer 15 is applied with a quantization coefficient from a rate controller 64 and reduces the redundancy of one block signal by requantizing the DCT output. The rate controller 64 generates a quantization coefficient based on a transformation coefficient from the DCT unit 13 and data from a rate controller 67. The quantized data from the quantizer 15 is applied to a variable length encoder 16 and an inverse quantizer 21.

By the way, when performing the inter-frame compression, it is necessary to compensate the motion of the picture. The quantized output is applied to the inverse quantizer 21. Receiving a quantization coefficient from the rate controller 64, the inverse quantizer 21 inverse quantizes the quantized output and applies it to an inverse DCT unit 22. The inverse DCT unit 22 executes the inverse DCT processing on the output of the inverse quantizer 21 to restore it to the original video signal and applies it to an adder 23. In this case, as the output of the extractor 12 is differential information, the output of the inverse DCT unit 22 is also differential information. The output of the adder 23 is fed back through an inter-frame predictor 68 and a switch 69. The adder 23 playbacks and then supplies the current frame data by adding a differential data to the preceding frame data.

The inter-frame predictor 68 is also applied with a motion vector from a motion detector 26. The motion detector 26 receives an input signal from the preprocessor 61 and obtains a motion vector. The inter-frame predictor 68 compensates the output of the adder 23 by the motion vector and applies it to a subtracter 12 and also, to the adder 23 through the switch 69. The switch 69 is controlled by the intra-frame/inter-frame identifier 63. Thus, the motion compensated preceding frame data are supplied to the subtracter 12.

The variable length encoder 16, for instance, encodes the quantized output to Huffman codes and applies the encoded output to a buffer 65 and a data length counter 66. The buffer 65 accumulates variable length codes and applies them to a multiplexer (hereinafter referred to as MPX) 70. The rate controller 67 monitors the amount of output data from the variable length encoder 16 according to the cumulative state of the buffer 65 and based on the monitoring result, controls the variable length encoder 16 to restrict the amount of output data and also, controls the rate controller 64 to change the quantization coefficient of the quantizer 15, thus adjusting the amount of output data. A data length adjuster 74, under the control of the rate controller 67, generates adjustment bit data and applies them to the buffer 65.

The data length counter 66 counts data lengths of all blocks from the output of the variable length encoder 16 and further, obtains data lengths of sub-macro blocks by accumulating block data lengths and applies them to the MPX 70 and a data length counter 71. The data length counter 71 accumulates data lengths of 4 sub-macro blocks from the data length counter 66 and further, obtains macro block data lengths by adding the header data lengths and applies them to the MPX 70. A header signal generator 72 generators the header of the small blocks and the macro blocks. The header signal generator 72 generates, for instance, a header signal which indicates whether data are intra-frame data or inter-frame data and applies it to the MPX 70. The MPX 70, under the control of a controller 73, transmits the data which are applied in the data arrangement illustrated in FIG. 8.

Next, the operation of the encoder in the construction as described above will be explained.

Input signals are preprocessed in the preprocessor 61 and are applied to the subtracter 12 and the switch 62 in unit of block. When performing the intra-frame compression, the switch 62, under the control of the intraframe/inter-frame identifier 63, selects the output of the preprocessor 61. The block data from the preprocessor 61 are applied to the DCT unit 13 for execution of the two dimensional DCT processing. The output of the DCT unit 13 is quantized in the quantizer 16 and transformed to variable length codes in the variable length encoder 16. These variable length codes are accumulated in the buffer 65. Amount of data is controlled at a constant level (the rate control) according to the state of variable length data accumulated in the buffer 65. That is, the rate controller 67 specifies the upper limit of data lengths by controlling the variable length encoder 16. Further, the rate controller 64 controls the quantization coefficient based on the outputs of the rate controller 67 and the DCT transformation coefficient and adjusts data lengths.

When performing the inter-frame compression, the output of the preprocessor 61 is applied to the subtracter 12. The subtracter 12 is supplied with the motion compensated preceding frame data as a predictive value and the subtracter 12 applies a differential signal of two input signals to the DCT unit 13 through the switch 62. The output of the quantizer 15 is inverse-quantized in the inverse quantizer 21 and further, inverse DCT processed in an inverse DCT unit 22 and restored to the original data before inputing to the DCT unit 13 and applied to an adder 23. The output of the adder 23 is applied to an inter-frame predictor 68, which obtains predictive value by the motion vector from the motion detector 26 and applies it to the subtracter 12 and also, feeds it back to the adder 23 through a switch 69. That is, the adder 23 obtains differential data (local decoded data) partially and the inter-frame predictor 68 obtains a predictive value from this differential data and the motion vector. Further, the intra-frame/inter-frame identifier 63 controls whether the intra-frame or inter-frame compression is to be performed by an external control signal and the motion detecting signal.

Thus, the variable length encoder 16 obtains inter-frame variable length data and intra-frame variable length data, the rate controller 64 obtains a quantization coefficient, and the motion detector 26 obtains a motion vector and applies it to the MPX 70.

Further, the data length counter 66 counts block data lengths from variable length codes, obtains data lengths of sub-macro blocks by emulating block data lengths, and applies them to the MPX 70. The data length counter 71 obtains the macro block data length by emulating the sub-macro block data lengths and applies it to the MPX 70. Further, the header signal generator 72 generates the macro block and sub-macro block headers and applies them to the MPX 70. Further, when performing the intra-frame compression, the output of the data length counter 66 will be intra-frame data length.

The MPX 70, under the control of the controller 73, selects input data, reconstructs them in order and outputs them. This will make it possible to arrange data in the data format using A=A1, as shown in FIG. 8, and transmits them.

Further, the data lengths of the macro block header and the small block header are not applied to the data length counters 66 and 71. The macro block data length 51 and the intra-frame data length 56 may or may not contain the header data length in the format, as shown in FIG. 8. As multiplexing timings of all data are decided by the controller 73, the header data length can be obtained easily by the controller 53. Therefore, when the header data length is contained in the macro block data length 51 and the intra-frame data length 56, it is only required to supply data from the controller 53 to the data length counters 66 and 71.

The passages of A=A2 and A=A3 illustrated in FIG. 8 are used to such recording media as VCR, etc. When selecting these passages, the value A of the quantization coefficient from the rate controller 64 should be made A2 or A3 by the rate controller 67. If A=A2, a data length adjuster 74, under the control of the rate controller 67, applies adjustment bit data for data adjustment bit length to the MPX 70 through the buffer 65. As a result, the data formats shown in FIGS. 15 and 16 are obtained. If A=A3, the controller 73 outputs a control signal for directing corrections from the MPX 70.

Further, the second passage of A=A2 may be adopted in the data transmission from a broadcasting station. For instance, if a vacancy is generated in the data transmission for convenience of packet and the buffer 65 becomes underflow, the rate controller 67 controls the data length adjuster 74 to generate a prescribed bit length adjusting bit.

Figure 18:
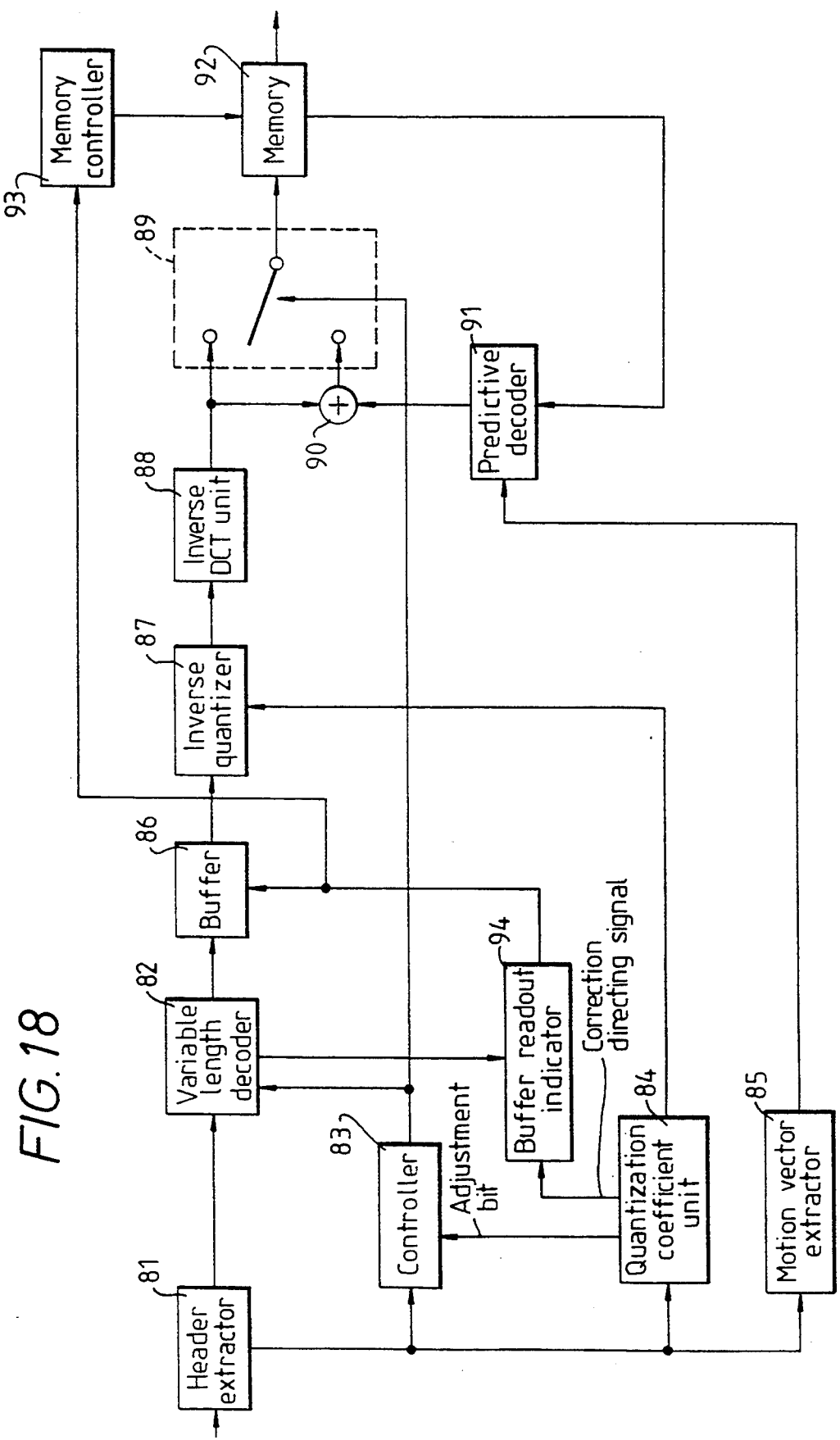
FIG. 18 is an explanatory diagram for explaining the operation of the embodiment shown in FIG. 8.

FIG. 18 is a block diagram showing a decoder to decode transmission data in the data format illustrated in FIG. 8.

A header extractor 81 of the decoder extracts the macro block header and the sub-macro header from encoded data. The output of the header extractor 81 is applied to a variable length decoder 82, a controller 83, a quantization coefficient unit 84 and a motion vector extractor 85. The variable length decoder 82 decodes the received data in variable length and applies it to a buffer 86. The controller 83 is applied with intra-frame data length, macro block data length and adjustment bit length data. The controller 83 controls the variable length decoder 82 using these data to prevent propagation of error and confirms if input block data are proper. Further, the controller 83 is applied with a header signal and controls a switch 89 which is described later by discriminating whether data are intra-frame compression data of inter-frame compression data.

The output of the buffer 86 is applied to inverse quantizer 87. The quantization coefficient unit 84 extracts a quantization coefficient from the output of the header extractor 81 and applies it to the inverse quantizer 87. The inverse quantizer 87 inverse-quantizes the variable length decoded output using the quantization coefficient and applies it to an inverse DCT unit 88. The inverse DCT unit 88 restore the inverse quantized output to the original data by performing the inverse DCT processing and applies it to the switch 89 and an adder 90. If the controller 83 indicates that the input data is the intra-frame compression data, the switch 89 selects the decoded data from the inverse DCT unit 88 and applies it to a memory 92.

The motion vector extractor 85 extracts a motion vector from the output of the header extractor 81 and applies it to a predictive decoder 91. The predictive decoder 91 is applied with the preceding frame decoded data from the memory 92 and performs the motion compensation of the preceding frame data according to the motion vector and applies the motion compensated preceding frame data to an adder 90. The adder 90 decodes the inter-frame compressed data by adding the output of the predictive decoder 91 and the output of the inverse DCT unit 88 and applies the decoded data to the switch 89. If inter-frame compression data are input, the switch 89, under the control of the controller 83, selects the output of the adder 90 and applies it to the memory 92.

In this first embodiment the quantization coefficient unit 84 discriminates a value of a quantization coefficient. That is, if A=A1, the quantization coefficient unit 84 applies the quantization coeficient directly to the inverse quantizer 87, while if A=A2, the quantization coefficient unit 84 outputs a signal indicating that the input data is the adjustment bit to the controller 83 to grasp the adjustment bit length. As a result, the controller 83 stops the decoding operation of the variable length decoder 82. After suspending the decoding for the period when data in the data length defined by the adjustment bit length is input, the controller 83 issues an instruction to resume the decoding.

Further, if A=A3, the quantization coefficient unit 84 gives a correcting instruction to a buffer readout indicator 94. When given with this correcting instruction, the buffer readout indicator 94 controls the buffer 86 to suspend the data readout and also, controls a memory controller 93 to inhibit write to a memory 92. As a result, the data stored in the memory 92 are not updated by the decoded data of the block or the small block for which the correcting instruction is generated. That is, for these blocks, the preceding frame decoded data are left without being updated. Further, even when the variable length decoding error is generated, a request for correcting instruction is generated to the buffer readout indicator 94 from the variable length decoder 82.

Figure 19:
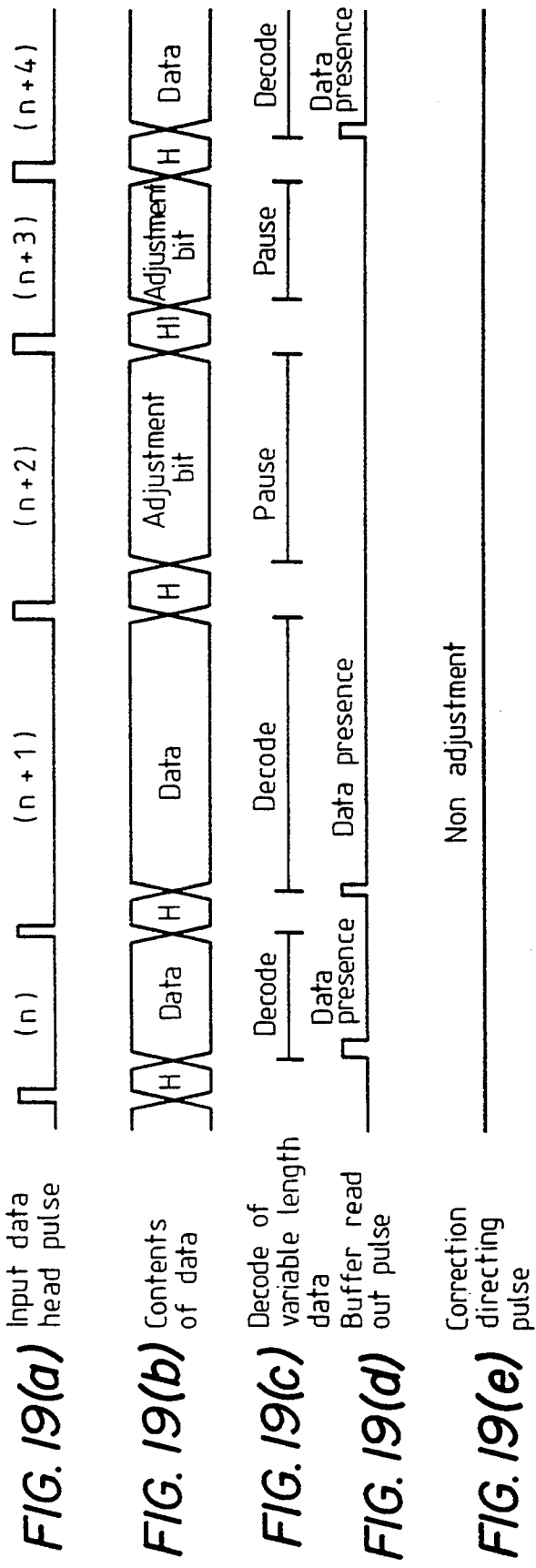
FIGS. 19(a)–19(e) are time diagrams explaining the operation of the embodiment shown in FIG. 8.
Figure 20:
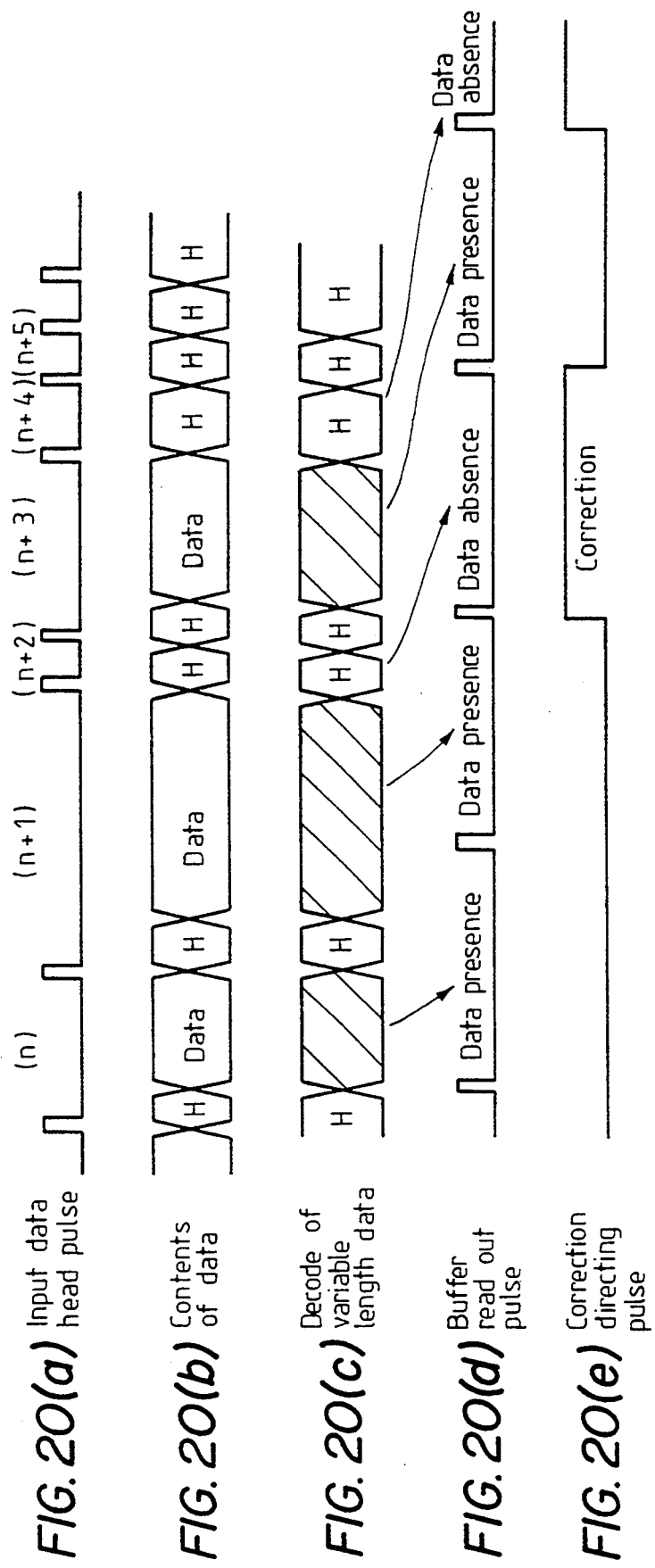
FIGS. 20(a)–(e) are timing diagrams for explaining the operation of the embodiment shown in FIG. 8.

Referring now to the timing charts shown in FIGS. 19(a)-19(e) and 20(a)-20(e) the operation of the decoder in the construction as described above will be explained in detail. FIGS. 19(a)-19(e) is explain the second passage of A=A2 and FIG. 20(a)-20(e) explain the third passage of A=A3. In FIGS. 19(b) and 20(b) and 20(c) H indicates the header.

Data applied to the decoder is applied to the header extractor 81 for extracting a header signal. The variable length decoder 82 decodes the output of the header extractor 81 in variable length and applies it to the buffer 86. The decoded data is made to a fixed length in the buffer 86 and is applied to the inverse quantizer 87. The quantization coefficient unit 84 extracts a quantization coefficient and supplies it to the inverse quantizer 87. The inverse quantizer inversely quantizes the variable length decoded data using this quantization coefficient. The inverse DCT unit decodes the inverse quantized output to the original data by performing the inverse DCT processing on the inverse quantized output. If the input data is intra-frame compression data, the switch 89 selects the output of the inverse DCT unit 88 by the controller 83 and the decoded output from the inverse DCT unit 88 is stored in the memory 92 through the switch 89. If the input data is inter-frame compression data, the output of the inverse DCT unit 88 is applied to the adder 90 and added with the motion compensated preceding frame data. As a result, the decoded output of the inter-frame compression data is obtained and the decoded output is stored in the memory 92 through the switch 89.

Now, it is assumed that the input data illustrated in FIG. 19(b) is input. As shown in FIG. 19(b), the nth, the (N+1)th and the (n+4)th macro blocks are encoded data, that is, they are the data resulted from the first passage of A=A1 in the encoding, and the (n+2)th and the (n+3)th macro blocks are adjustment bit data, that is, they are the data resulted from the second passage of A=A2 in the encoding. When detecting that the quantization coefficient of the nth macro block data is A=A1 from the output of the header extractor 81, the quantization coefficient unit 84 instructs the buffer readout indicator 94 to output the decoded data from the variable length decoder 82 to the inverse quantizer 87. The buffer readout pulse illustrated in FIG. 19(d) is generated from the buffer readout indicator 94 and the decoded output illustrated in FIG. 19(c) is applied to the inverse quantizer 87.

Here, if the (n+2)th macro block data is input, the quantization coefficient unit 84 detects the data is that data resulted from the second passage of A=A2 and outputs as signal representing that the input data is the adjustment bit to the controller 83. The controller 83 directs the variable decoder 82 to suspend the decoding operation as shown in FIG. 19(c). The buffer readout pulse is not generated from the buffer readout indicator 94, as shown in FIG. 19(d), and no data is applied to the inverse quantizer 87.

Then, if the (n+4)th macro block data is input, the decoding operation is resumed and the decoded data of (n+4)th macro block is written into the memory 92. Thus, the input intra-frame data is surely decoded.

Here it is assumed that the input data train illustrated in FIG. 20(b) is input. As shown in FIG. 20(b), the encoded data of the nth, the (n+1)th and the (N+3)th are transmitted while the (n+2)th, the (n+4)th and the (n+5)th macro block data are not transmitted.

If the (n+2)th macro block data is input, the quantization coefficient unit 84 detects from the output of the head extractor 81 that the data is that resulted from the third passage of A=A3 and applies the correcting instruction to the buffer readout indicator 94. The buffer readout indicator 94 gives an instruction to the buffer B6 to suspend the readout of the decoded output. Further, the buffer readout indicator 94 also gives an instruction to the memory controller 93 to inhibit updating of the address of the memory 92 corresponding to the the (n+2)th macro block. Thus, it becomes possible to correct the portion corresponding to the adjustment bit by the preceding frame data.

Figure 21:
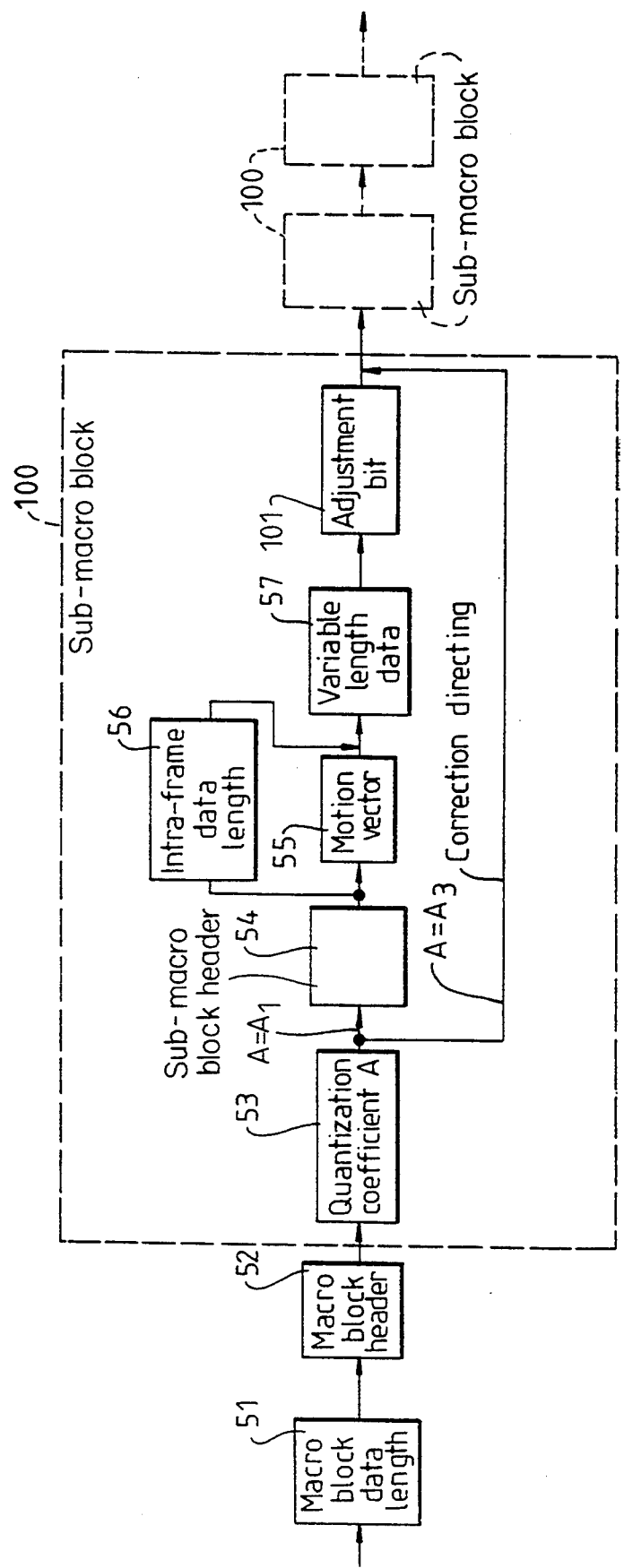
FIG. 21 is an explanatory diagram for explaining the operation of the embodiment shown in FIG. 8.

FIG. 21 is an explanatory diagram showing the data construction of a modification of the first embodiment of the present invention. In FIG. 21, the same elements as in FIG. 8 are assigned with the same reference numerals and the explanations are eliminated.

The small block 100 of this embodiment differs from the embodiment, as shown in FIG. 8, in that three passages of A=A1, A=A2 and A=A3 are changed to two passages of A=A1 and A=A3 and the adjustment bit 101 is added after the variable length data 57. The adjustment bit 101 corresponds to the second passage of A=A2 illustrated in FIG. 8.

In the data format in the construction described above, data which does not exist as the Huffman code (for instance, an all "1" data train) is added as the adjustment bit 101. As a result, the adjustment bit 101 is processed as a data which cannot be decoded. After all, this bit 101 serves as the adjustment bit as in the second passage of A=A2 in FIG. 8.

Figure 22:
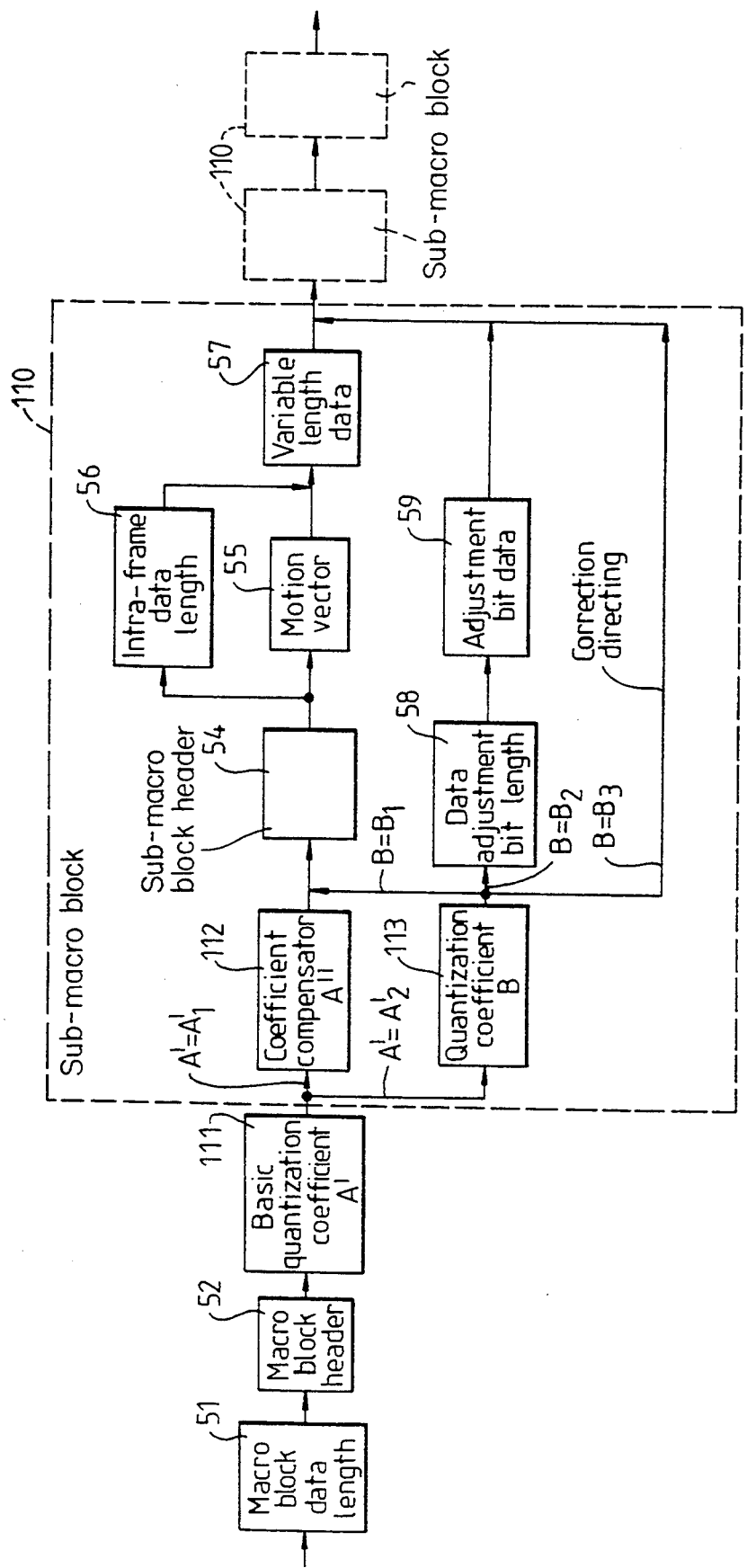
FIG. 22 is an explanatory diagram showing the data construction of another modification of the first embodiment of the present invention.

FIG. 22 is an explanatory diagram showing the data construction of another modification of the first embodiment of the present invention. In FIG. 22, the same element as in FIG. 8 are assigned with the same reference numerals and the explanations are eliminated.

In this embodiment, the basic quantization coefficient 111 of the macro block is allocated in front of the sub-macro block 110. If the value of the basic quantization coefficient is A' and a difference between A' and the basic quantization coefficient of each sub-macro block is A", A'+A" becomes the quantization coefficient B of the sub-macro block 110. At the head position of the sub-macro block, the coefficient compensator 112 of the quantization coefficient of the value A" is allocated. If the basic quantization coefficient value A' of the quantization coefficient 111 is A1', it is routed to the quantization coefficient 112, if it is A'=A2', it is routed to the quantization coefficient 113. The quantization coefficient 113 is a data of quantization coefficient B of the sub-macro block. When the value of the quantization coefficient 113 is B1, B2 or B3, the passage is the same as the passage in case of A1, A2 or A3 illustrated in FIG. 8.

According to the data format in the construction as described above, the passage is performed with the basic quantization coefficient value A'. That is, if data are reconstructed discontinuously, the small block quantization coefficient B cannot be obtained by the basic quantization coefficient A' and a difference A". Therefore, in such a case, it is made possible to transmit the quantization coefficient B by the second passage of A'=A2'. Other operations and effects are the same as those in the embodiment in FIG. 8.

As described above, the first embodiment of the present invention can provide an extremely preferable high efficient encoding/decoding system which is capable of facilitating the format conversion, effective decoding of data using discontinuous data and restricting propagation of errors without lowering data utilization coefficient.

Figure 23:
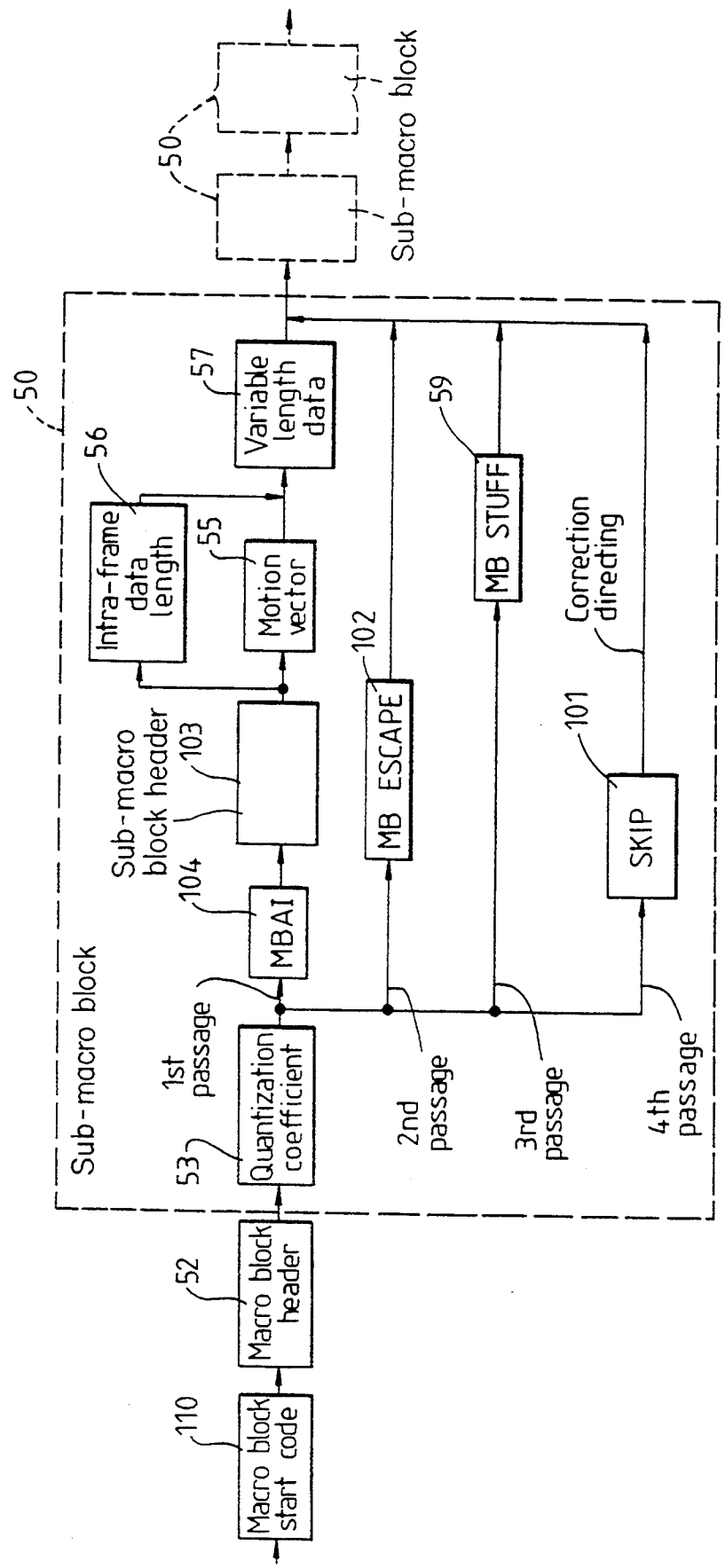
FIG. 23 is an explanatory diagram showing a first embodiment of the high efficient encoding/decoding system of the present invention.

Referring now to FIGS. 23 through 29, a second embodiment of the present invention will be described in detail. FIG. 23 is an explanatory diagram showing a first embodiment of the high efficient encoding/decoding system of the present invention. FIG. 23 shows the encoded data structure. FIGS. 9 and 10 in the first embodiment will be again used for explaining the technique for constructing encoded data shown in FIG. 23. Further, FIG. 24 is an explanatory diagram showing a bit stream structure (a syntax) of the MPEG system.

First, only the portion of the syntax of the MPEG system (Reference Literature 1 "International Standard for Multimedia Encoding" by Hiroshi Yasuda (published from Maruzen) shown in FIGS. 24a and 24(b) which relates to this embodiment of the present invention, will be explained. Further, abbreviations used in the figure are not those used in the document of the standard plan but are peculiar to Literature 1.

Figure 24A:
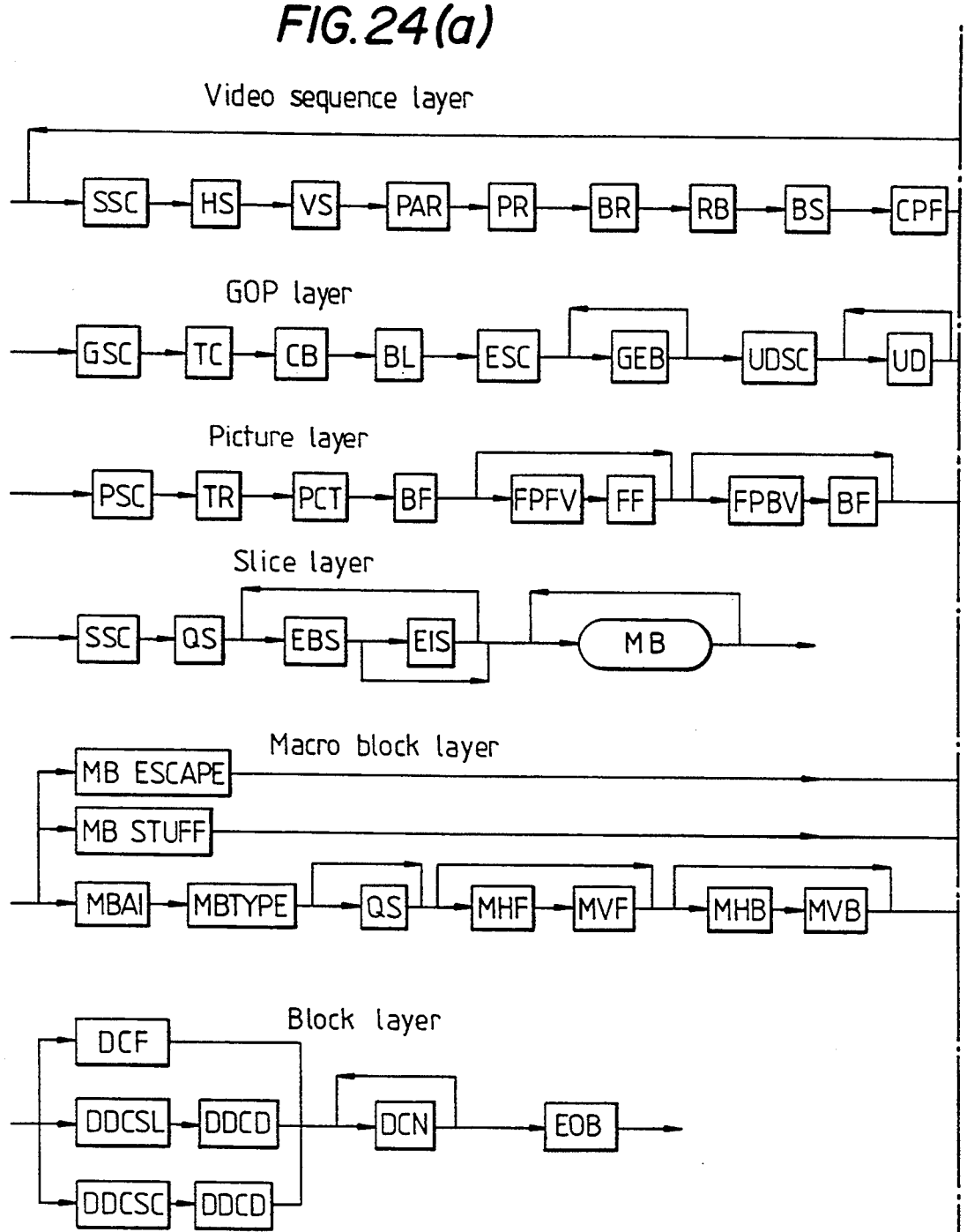
FIGS. 24(a) and 24(b) are explanatory diagrams showing a bit stream structure (a syntax) of the MPEG system.
Figure 24B:
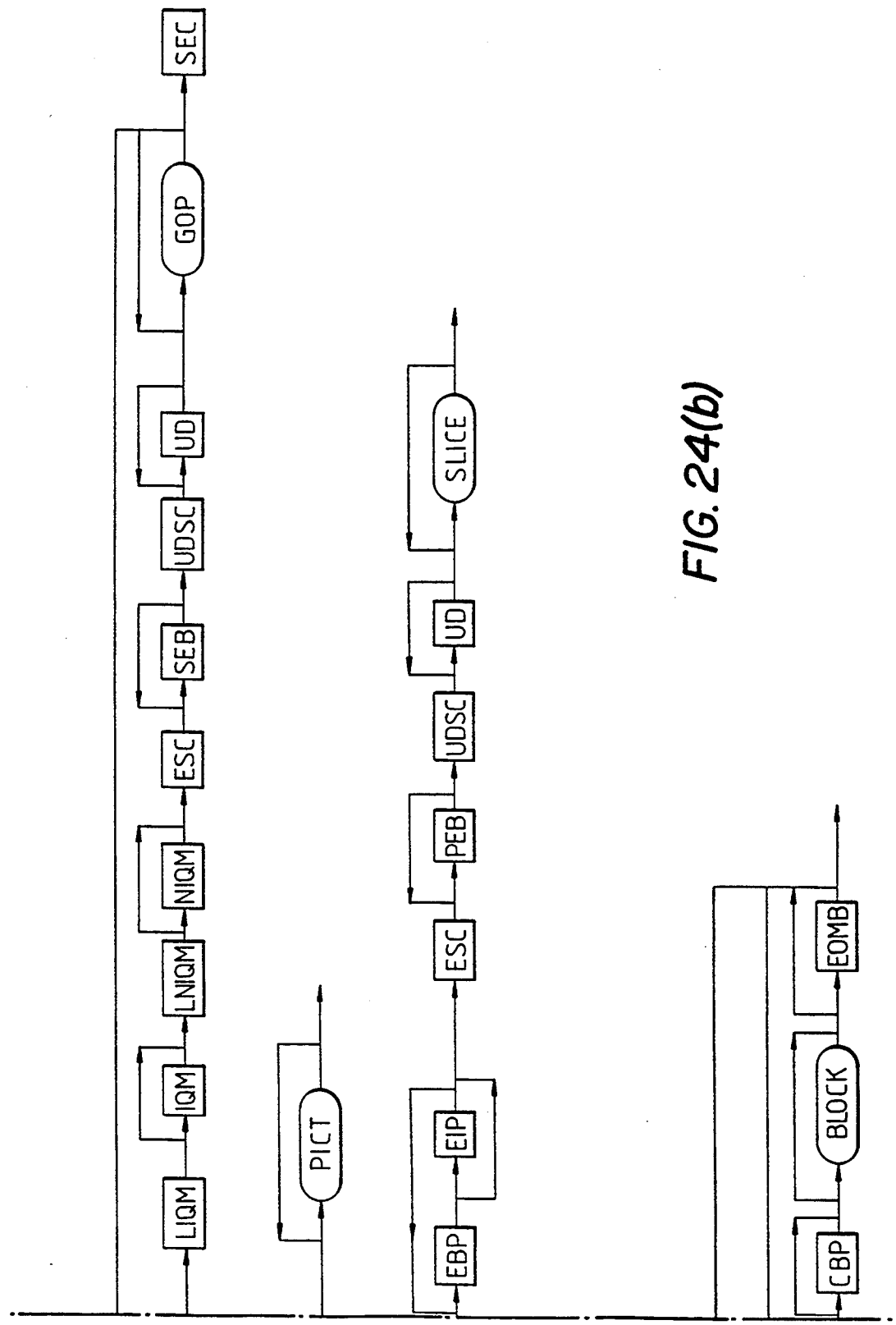

As shown in FIGS. 24(a) and 24(b) a synchronizing code (hereinafter referred to as the start code) SSC (sequence start code) showing the start of the video sequence layer is allocated at the head position of the layer. Thereafter, HS, VS, PAR, ..., UD are sequentially allocated and one or more GOPs (GOP layer data) are allocated and lastly, the synchronizing code SED (sequence end code) showing the end of one or more sequences is allocated.

The start code GSC (group start code) showing the start of GOP is allocated at the head position of the GOP layer, followed by TC, CT, ..., UD and lastly, the data PICT (Picture Layer Data) composed of one or more I pictures and zero or more pictures other than I picture. The start code PSC (picture start code) showing the start of the picture layer is allocated at the head position of the picture layer, followed by TR, PCT ... , UD and lastly the data SLICE (slice layer data) of one or more slice layers. The start code SSC (slice start code) showing the start of the slice layer is allocated at the head position of the slice layer, followed by QS, EBS, EIS and lastly, the data MB (macro block layer data) of one or more macro block layers.

The macro block layer is routed to MBAI (macro block address increment), MB STUFF (macro block stuffing) or MB ESCAPE (macro block escape) according to the conditions established for each encoded picture. In the MPEG system, MB which is not required for transmission by the inter-frame encoding is skipped without being transmitted as in a case of two still pictures. The MBAI indicates the number of these skips. The MABI normally represents the progress from MB which was transmitted in advance. The MBAI at the head position of the SLICE represents the horizontal position in the screen by the number of macro blocks. The on-screen horizontal and vertical positions of the SLICE layer can be grasped by these two information. The number of skips which can be expressed by the MBAI is up to 33 and for the number of skips above 33, the MB ESC that is equivalent to the skip MB of 33 is used. The MB STUFF is a dummy code that is used for rate control.

TABLE 2 as shown below represents start codes. As represented in TABLE 2, the start codes SSC, GSC, PSC and SSC are special codes comprising plural bits and each code contains a bit pattern which can be discriminated from other data. These codes, when detected, represent the head position of the video sequence layer, GOP layer, picture layer or slice layer. Further, the start code (SSC) of each SLICE contains the vertical position representing the on-screen vertical block position, as represented in TABLE 2.

TABLE 2

| START CODE | HEXADECIMAL |
| --- | --- |
| picture start code | 00000100 |
| slice start codes (including slice vertical positions) | 00000101 through 000001AF |
| reserved | 000001B0 |
| reserved | 000001B1 |
| user data start code | 000001B2 |
| sequence start code | 000001B3 |
| sequence error code | 000001B4 |
| extension start code | 000001B5 |
| sequence end code | 000001B7 |
| group start code | 000001B8 |
| system start codes | 000001B9 through 000001FF |

Here the construction of the data format used in this second embodiment are the same as those shown in FIGS. 9 and 10 in the first embodiment. Thus, explanations about the construction of the data format in this second embodiment will be omitted herewith.

Further, as illustrated in FIG. 3(b), a group of four small blocks forms one macro block (the definition of this macro block differs from the conventional example). Therefore, one frame picture is composed of 16 horizontal small blocks×50 vertical sub-macro blocks as illustrated in FIG. 3(c) or 4 horizontal macro blocks×60 vertical macro blocks when expressed in terms of macro blocks.

Although the on-screen positions of macro blocks have been fixed in FIG. 10(c), the macro block can be started from any position and it is also not needed to fix its length. For instance, the first through the 16th macro blocks in FIG. 10(c) can be reconstructed to one macro block, or the first through the 32nd macro blocks can be reconstructed to one macro block. Further, in the MPEG system, the standard sampling frequency ratio of Y:Cr:Cb is 4:2:0. However, it is explained as 4:1:1 in this embodiment for convenience of the explanation.

The construction of block data of the second embodiment is also the same as those of the first embodiment. Thus explanations about the construction of block data of the second embodiment will be omitted herewith.

The constructions of the macro blocks and the small blocks are explained with reference to FIG. 23. They are illustrated by enclosing with the broken line in FIG. 23.

A macro block start code 110 is allocated at the head position of a macro block. This start code 110 represents the data position of each macro block. If an error, etc. occurs in any macro block, the head position of next macro block can be known by detecting this start code 110. Thus, propagation of the error occurring in that macro block is prevented.

Then, a macro block header 52 is allocated. The macro block header 52 represents the consolidated information of the entire macro blocks, and also represents, for instance, additional information, etc. Following the macro block header 52, more than one sub-macro blocks 50 are allocated.

In the sub-macro block 50, a quantization coefficient 53 is first allocated. In the high efficient encoding, data are quantized after the DCT transformation. The quantization coefficient 53 is a coefficient required for generating a quantizing table which is used for the quantizing processing. After allocating the quantization coefficient 53, data are routed to any one of first through fourth passages according to conditions that will be described later.

In the first passage, an MBAI 104 is first allocated and then followed by a sub-macro block header 103. The MBAI of the sub-macro block 50 at the head position of a macro block represents the horizontal position of the macro block, while an MBAI other than this MBAI represents a difference in addresses from the small block transmitted in advance. For instance, if a predictive error becomes 0 and the sub-macro block 50 requiring no transmission occurred as in a case where two still pictures were inter-frame encoded, only the predictive error being 0 is transmitted and this sub-macro block 50 is skipped. An MBAI other than that at the head position of a macro block represents the number of sub-macro blocks 50 skipped by the fourth passage, as described later. The small block header 103 describes the header of the small block 50. By this sub-macro block header 103 it becomes possible to discriminate whether the compression is the intra-frame compression or the inter-frame compression and whether it is field or frame. Further, the sub-macro block header 103 contains other required information relative to the small block 50.

Following the sub-macro block header 103, the operation is routed to either a motion vector 55 or an intra-frame data length 56. The intra-frame data length 56 indicates the data length of the small block 50 when the sub-macro block 50 is the intra-frame compression data. As described above, it is possible to decode the intra-frame data independently and reconstruction efficiency in a trick play operation can be improved when the intra-frame data are reconstructed. That is, according to the information of the intra-frame data length 56, a data format change to such a recording medium can be made relatively easily and a variable length signal can be extracted without decoding in a playback operation. When the sub-macro block 50 is inter-frame compression data, the operation is routed from the small block header 103 to the motion vector 55. The motion vector 55 gives a vector (a motion vector) representing the pixel positions of the preceding frame, which becomes the inter-frame compression frame standard.

Following the intra-frame data length 56 or the motion vector 55, the variable length data 57 is allocated. The variable length data 57 is obtained by, for instance, quantizing the DCT transformation coefficient and encoding the quantized output, which is read through the zigzag tracing, to the Huffman codes (variable length encoding) according to its generating probability.

In the second passage, the MB ESCAPE 102 is allocated. This MB ESCAPE 102 represents that there are the prescribed number of sub-macro blocks to be skipped (hereinafter referred to as the skip SB). When this embodiment is applied, the number of skips that can be expressed by the MBAI 104 is 33, and thus the MB ESCAPE 102 indicates the 33 skips. If, for instance, the number of skips is 34, the MB ESCAPE 102 and the MBAI 104 are a and if the number of skips is 68, the MB ESCAPE 102 is 2 (or it indicates 66 skips SB) and the MBAI 104 is also 2. It has been intended to decrease data volume by adopting this MB ESCAPE 102.

In the third passage, the MB STUFF 59 for data length adjustment is allocated. The MB STUFF 59 is data length adjustment bit data for maintaining a transmission rate constant. Further, information on data length of the data length adjustment bit may be included in the MB STUFF 59.

In the fourth passage, only the SKIP 101 representing a correction instruction is transmitted. The SKIP 101 does not represent that a differential value is zero as in the MB ESCAPE 102 in the second passage, but represents that data were lost. Discontinuous portion of data is corrected by, for instance, preceding frame data by controlling a decoder using the SKIP 101.

An encoder for realizing the data construction of FIG. 23 is the same as that of the first embodiment, as shown in FIG. 17. Thus explanations about the encoder of the FIG. 23 will be omitted herewith.

Further, in this second embodiment when performing the intra-frame compression in relation to FIG. 17, the output of the data length counter 66 will be intra-frame data length. A data length adjuster 74, under the control by the rate controller 67, supplies the MB STUFF 59 representing an adjusting bit data for a data adjusting bit length to the MPX 70 through the buffer 65.

The MPX 70, under the control by the controller 73, selects input data, and then sequentially outputs the selected input data. In this case, the controller 73 generates the MBAI 104, MB ESCAPE 102, MB STUFF 59 or SKIP 101 according to the first through the fourth passage, respectively, and then outputs them through the MPX 70. For instance, in case of the fourth passage, the controller 73 outputs the SKIP 101 representing a correction instruction through the MPX 70. Further, in the MPEG system, the increment value 1 through 33 of the MBAI, MB ESCAPE and MB STUFF are discriminated by different codes in the same table as represented by the macro block address increment VLC (see Literature 1) in TABLE 3. Further, although the SKIP 101 has not been adopted by the MPEG system, by making the number of skips that can be expressed by the MB ESCAPE 32, the code for the increment value 33 listed in TABLE 3 may be assigned as the SKIP 101.

TABLE 3

| MACRO BLOCK ADDRESS INCREMENT VLC CODE | INCREMENT VALUE | MACRO BLOCK ADDRESS INCREMENT VLC CODE | INCREMENT VALUE |
| --- | --- | --- | --- |
| 1 | 1 | 0000 0101 10 | 17 |
| 011 | 2 | 0000 0101 01 | 18 |
| 010 | 3 | 0000 0101 00 | 19 |
| 0011 | 4 | 0000 0100 11 | 20 |
| 0010 | 5 | 0000 0100 10 | 21 |
| 0001 1 | 6 | 0000 0100 011 | 22 |
| 0001 0 | 7 | 0000 0100 010 | 23 |
| 0000 111 | 8 | 0000 0100 001 | 24 |
| 0000 110 | 9 | 0000 0100 000 | 25 |
| 0000 1011 | 10 | 0000 0011 111 | 26 |
| 0000 1010 | 11 | 0000 0011 110 | 27 |
| 0000 1001 | 12 | 0000 0011 101 | 28 |
| 0000 1000 | 13 | 0000 0011 100 | 29 |
| 0000 0111 | 14 | 0000 0011 011 | 30 |
| 0000 0110 | 15 | 0000 0011 010 | 31 |
| 0000 0101 11 | 16 | 0000 0011 001 | 32 |
|  |  | 0000 0011 000 | 33 |
|  |  | 0000 0001 111 | macroblock stuffing |
|  |  | 0000 0001 000 | macroblock escape |

Using Codes 104, 102, 59 and 101 generated by the controller 73, it is possible to allocate and transmit data in a data format using any one of the passages 1 through 4, as shown in FIG. 23. Further, the fourth passage, as shown in FIG. 23, is adopted in such recording media as VCR, etc.

A decoder for decoding data transmitted in the data format, as shown in FIG. 23, is the same as that of the first embodiment as shown in FIG. 18. Thus explanations about the decoder, as shown in the FIG. 23, will be omitted herewith.

In this second embodiment, the header extractor 81, as shown in FIG. 18, gives a quantization coefficient directly to the inverse quantizer 87 in case of the first and the second passages. In case of the third passage, the header extractor 81 supplies a signal indicating that the input data is an adjusting bit to the controller 83 for grasping the adjusting bit length. As a result, the controller 83 disables the decoding operation of the variable length decoder 82. After suspending the decoding for a period when adjusting data are input, the controller 83 gives an instruction to resume the decoding.

Further, in case of the fourth passage, the controller 83 gives a correction instruction to the buffer readout indicator 94. When given with this correction instruction, the buffer readout indicator 94 controls the buffer 86 to suspend the data readout and also, controls a memory controller 93 to inhibit write to a memory 92. As a result, the data stored in the memory 92 are not updated by the decoded data of the block or the sub-macro block for which the correction instruction was generated. That is, the preceding frame decoded data are left without being updated for these blocks. Further, even when the variable length decoding error is generated, a request for the correction instruction is generated to the buffer readout indicator 94 from the variable length decoder 82.

Thus, in this second embodiment it is possible to know the head positions of macro blocks and grasp the on-screen positions of macro blocks without necessity for macro block data length information by adopting start codes representing the head positions of respective macro blocks. Further, it is also possible to transmit a correction instruction by the SKIP. As start codes. MBAI, MB EACAPE and MB STUFF have been adopted, when applied to the MPEG system, the format transformation at the receiving section is facilitated, the decoding effectively using discontinuous data is enabled and furthermore, error propagation can be suppressed without deteriorating the data utilization efficiency.

Figure 25A:
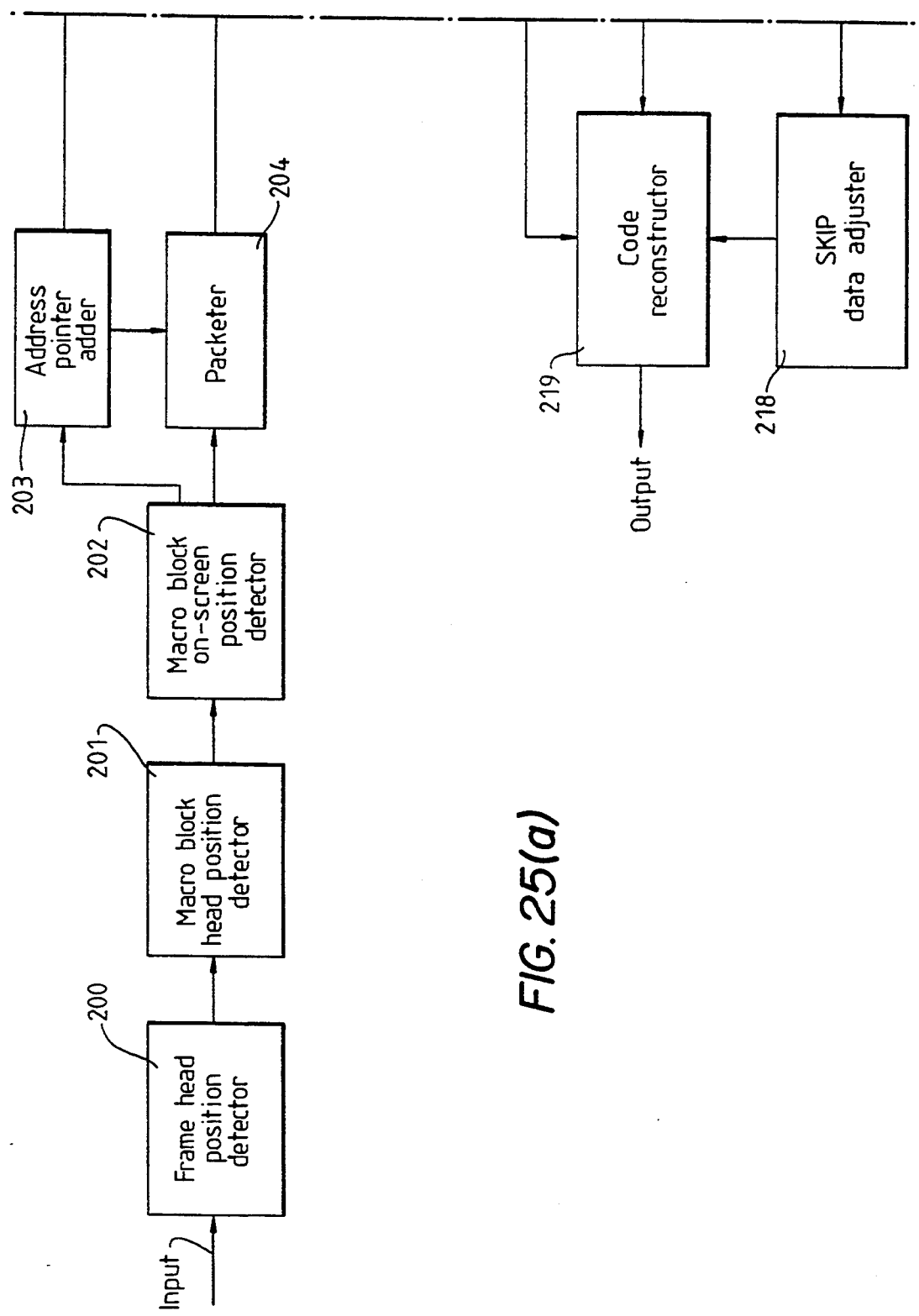
FIGS. 25(a) and 25(b) are explanatory diagrams showing a modification of this second embodiment of the present invention.
Figure 25B:
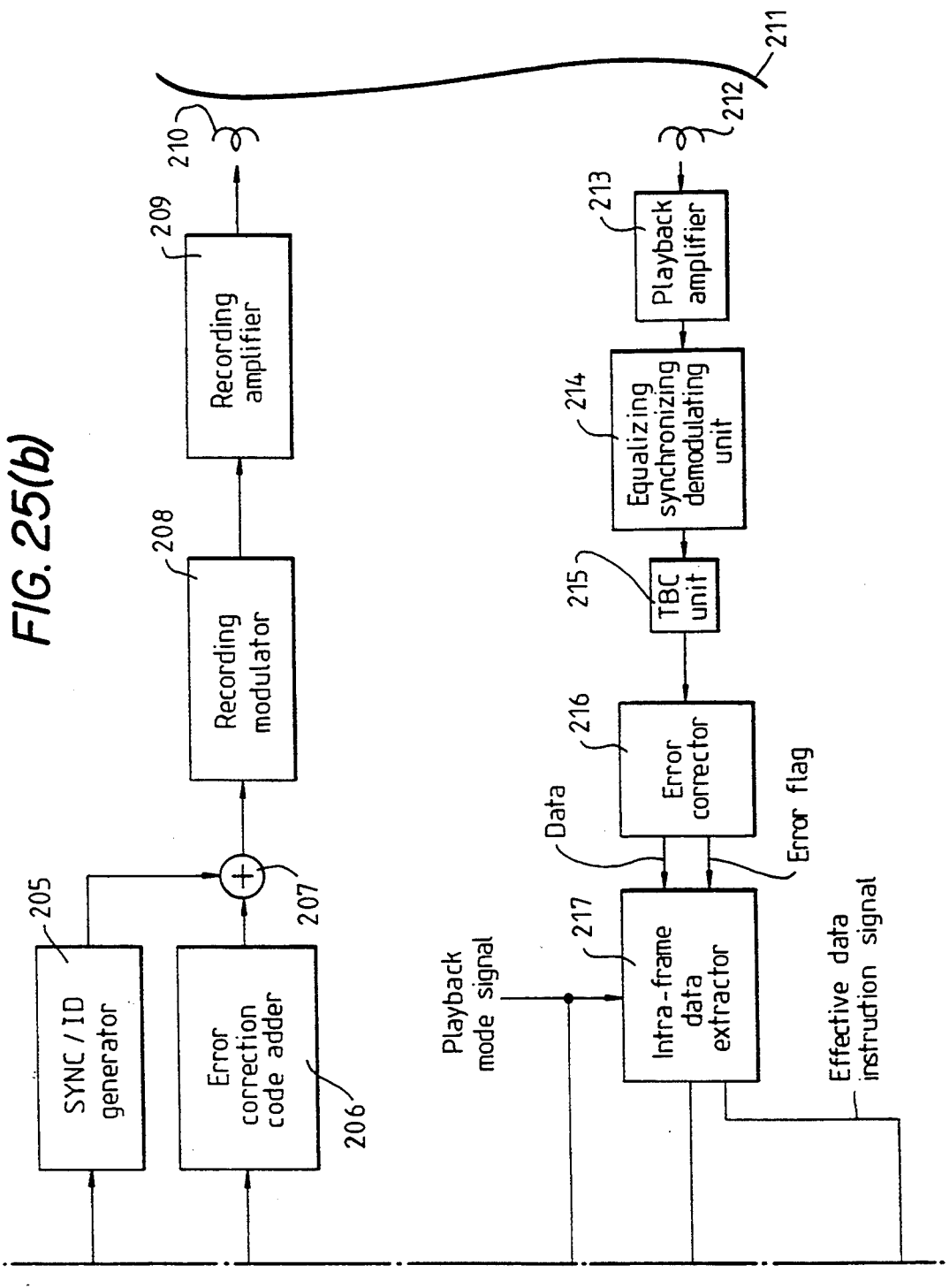

FIGS. 25(a) and 25(b) are block diagrams showing a modification of this second embodiment of the present invention. This modification illustrates an example of the application to video cassette recorders (VCR).

An input signal is given to a frame head position detector 200. The frame head position detector 200 detects a macro block at the frame head position and supplies the macro block to a macro block head position detector 201. Further, in the MPEG system, the SLICE head position at the frame head position may not be detected unless both of the frame head position and the SLICE head position are detected. The macro block head position detector 201, detecting the macro block start code contained in an input signal, detects the head position of the macro block and supplies it to a macro block on-screen position counter 202. The macro block on-screen position counter 202 obtains the on-screen vertical position of a macro block from its start code, and simultaneously obtains its on-screen horizontal position from information of the MBAI and supplies the on-screen positional correspondence information to a packeter 204 and a address pointer adder 203.

The address pointer adder 203 outputs the information on the on-screen positions of the macro blocks or the sub-macro blocks as addresses and also outputs the information on the head positions in the packets of respective macro blocks. The packeter 204 adds address information and macro block head position information to input data, packets them in a prescribed unit and supplies them to an error correction code adder 206.

The error correction code adder 206 supplies the output of the packeter 204 with an error correction code added to a multiplexer 207. A SYNC/ID generator 205 generates sync signal (SYNC) and ID signal and gives them to the multiplexer 207. The multiplexer 207 multiplexes SYNC/CD signals over packet data which are added with an error correction code and gives them to a recording modulator 208. The recording modulator 208 modulates input data to signals suited to recording and gives the modulated signals to a recording head 210 via a recording amplifier 209 for recording on a tape 211.

In the playback section, a playback head 212 playbacks the data recorded on the tape 211 and gives the playbacked data to an equalizing/synchronizing-/demodulating unit 214 through a playback amplifier 213. The equalizing/synchronizing/demodulating unit 214 equalizes the waveform of the playbacked data, extracts sync signal, demodulates to the original digital signal and gives it to a TBC unit 215.

The TBC unit 215 gives input data to an error corrector 216 after correcting the time base of input data. The error corrector 216 corrects an error using an error correction code and supplied the error corrected data to an intra-frame data extractor 217. If any error is left uncorrected, the error corrector 216 also transmits an error flag to the intra-frame data extractor 217.

When a trick play operation mode is instructed by a playback mode signal, the intra-frame data extractor 217 extracts intra-frame data only using intra-frame data length information. Further, the on-screen positions of respective data are revealed by the on-screen positional correspondence information. The output of the intra-frame data extractor 217 is given to a code reconstructor 219. The code reconstructor 219 reconstructs the output of the intra-frame data extractor 217 for one frame based on the playback mode signal. The intra-frame data extractor 217 gives an effective data instruction signal to a SKIP data adjuster 218. If invalidity of data such as blocks which were not reconstructed by the effective data instruction signal, etc. is indicated, the SKIP data adjuster 218 supplies a SKIP flag to the code reconstructor 219. If insufficient data length is indicated, the SKIP data adjuster 218 supplies a signal instructing adjustment of data length to the code reconstructor 219. When the SKIP flag is given, the code reconstructor 219 supplies the SKIP flag indicating a SKIP (correction) block at a timing corresponding to a block which was not reconstructed while outputs data after adjusting its length.

Figure 26:
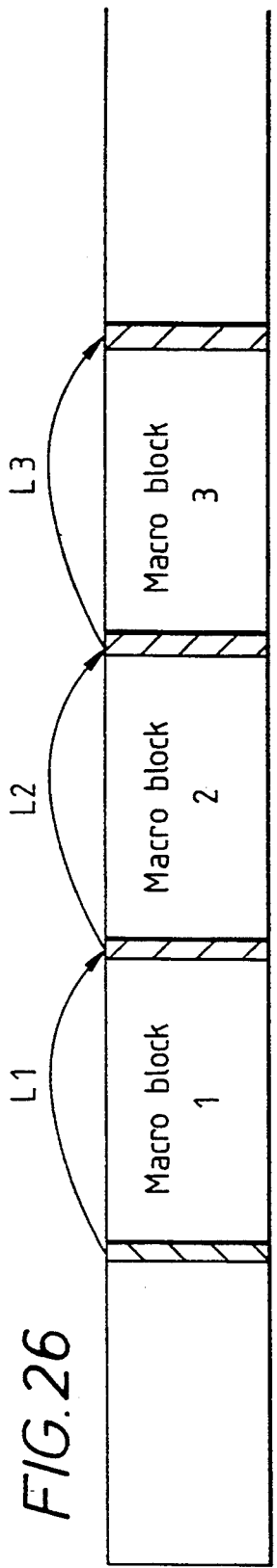
FIG. 26 is an explanatory diagram showing an input data string.
Figure 27:
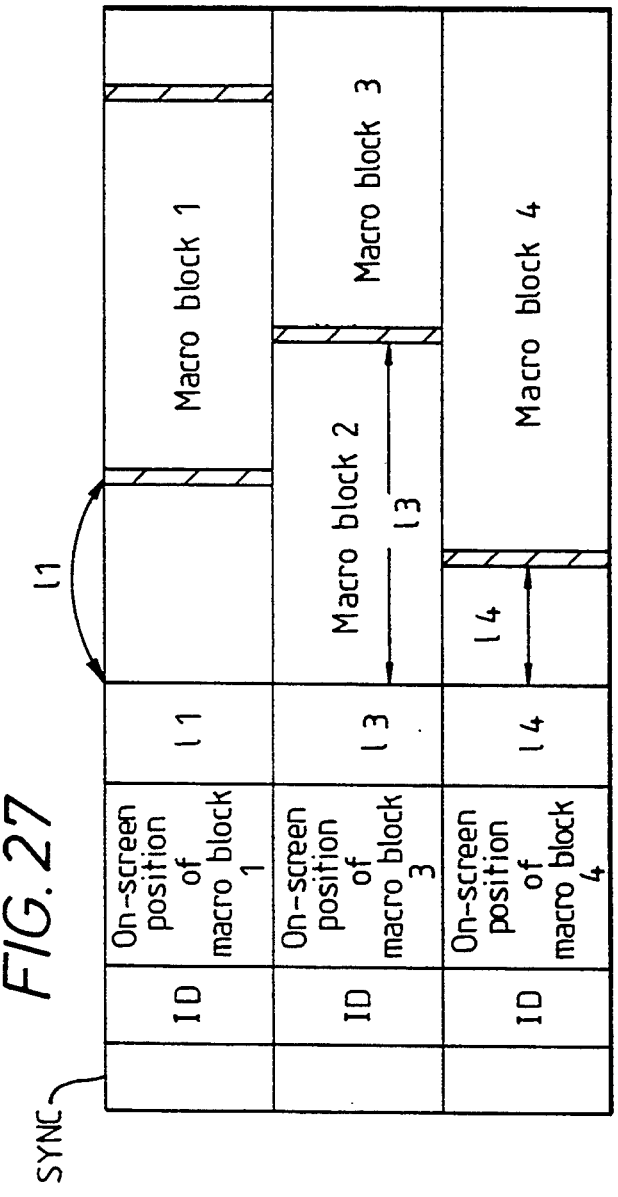
FIG. 27 is an explanatory diagram showing the record format of VCR.
Figures 28, 29:
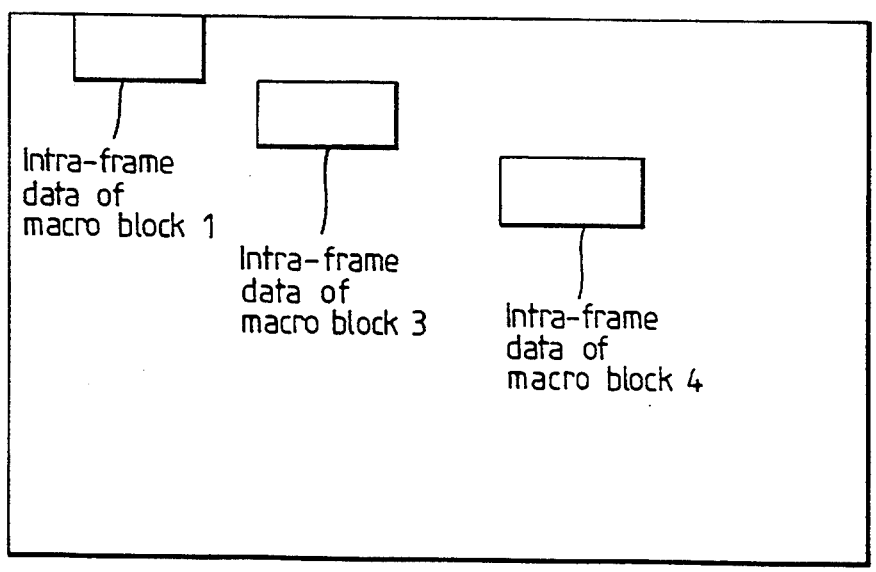
FIG. 28 is a diagram for explaining extraction of intra-frame data.
FIG. 29 is a diagram for explaining the on-screen positions of reconstructed data.

Next, the operations of the modification constructed as described above will be explained with reference to FIGS. 26 through 29. FIG. 26 is an explanatory diagram showing an input data string, FIG. 27 is an explanatory diagram showing the record format of VCR, FIG. 28 is a diagram for explaining extraction of intra-frame data and FIG. 29 is a diagram for explaining the on-screen positions of reconstructed data.

The input signal sown in FIG. 26 is given to the frame head position detector 200 and the macro block head position detector 201. To the head position of respective macro blocks, a macro block start code as illustrated in the oblique lined section in FIG. 26 has been added and for instance, a start code corresponding to a picture start code of the MPEG system has been added to a macro block at the frame head position. The frame head position detector 200 and the macro block head position detector 201 detect respective frame head positions and macro block head positions from these start codes.

The macro block on-screen position counter 202 obtains the on-screen vertical positions of the macro blocks from the start codes and at the same time, obtains the on-screen horizontal positions from the MBAI information, and supplies the on-screen positional correspondence information to indicate the correspondence between the macro blocks and the on-screen positions. The packeter 204 packets data for each packet unit length of a VCR. In this case, the on-screen positional correspondence information has been transformed to addresses and then supplied to the packeter 204. The packeter 204 packets input data by adding address information and macro block head position information, and then supplies the packet data to the error correction code adder 206. As each packet contains the on-screen positional correspondence information and the macro block head position information, it is possible to reconstruct data from the way of the packets even when discontinuous data are generated due to occurrence of errors, etc.

The packet data are added with error correction codes by the error correction adder 20, and further multiplexed with SYNC and ID signals and are given to the record modulation means 208. The record modulation means 208 transforms data to a record format suited for VCR and records the data on the tape 211 through the recording amplifier 209 and the recording head 210.

FIG. 27 shows one example of recorded data. As shown in FIG. 27, SYNC signal and ID signal are allocated at the head position of the packet data, followed by on-screen positional correspondence information representing the on-screen positions of macro blocks and the macro block head positions information (11, 12, 13, ...). As seen in FIG. 27, after a space 11 from the head position information of the macro block 1, its start code (the oblique lined section) is allocated and then, the macro block 1 is allocated. Thereafter, macro block are allocated in the same manner.

In the playback operation, the data recorded on the tape 211 are playbacked through the playback head 212. The playbacked data are then supplied to the equalizing-synchronizing-demodulating unit 214 through the playback amplifier 213. The equalizing-synchronizing-demodulating unit 214 restores the playbacked data to digital data, and then supplies them to the TBC unit 215. The TBC unit 215 passes the digital data to the error corrector 216 after correcting the time base of the data. The error corrector 216 corrects errors using an error correction code, and then supplies the error corrected data to the intra-frame data extractor 217.

As shown in FIG. 28, in a macro block containing intra-frame data, intra-frame data length information (1-$A$, 3-$A$, 4-$A$, ...) have been allocated following a start code. In the trick play operation, the intra-frame data extractor 217 exclusively extracts the intra-frame data from the playbacked data. For instance, when explaining the macro block 3, the head position of the macro block 3 is obtained according to the head position information 13 and intra-frame data only of the macro block 3 is extracted using the intra-frame data length information 3-$A$ which has been allocated next to a start code.

In the trick play operation, grasping the on-screen position according to the on-screen positional correspondence information of macro blocks, the code reconstructor 219 stores input intra-frame data of macro blocks sequentially for one frame time corresponding to the on-screen positions. FIG. 28 shows the correspondence of the intra-frame data stored in the code reconstructor 219 with the on-screen positions. For intra-frame data and inter-frame data which have not been playbacked, the intra-frame data extractor 217 outputs a signal indicating that these data are invalid, and thus the SKIP data adjuster 218 supplies the SKIP code to the code reconstructor 219. Thus, the code reconstructor 219 skips all data other than input intra-frame data. Further, if data are insufficient after they have been reconstructed, the code reconstructor 219 supplies them by inserting an adjusting bit according to data supplied from the SKIP data adjuster 218.

Thus, it is possible to construct the picture by using effectively the playbacked data even in a trick play operation.

Referring now to FIGS. 12 and 13, the trick play operation will be will be explained in more detail.

Now, data recorded on the hatched section only are playbacked in the trick play operation by a VCR as illustrated in FIG. 6. Further, when the playbacked signals of this hatched section are decoded to variable length codes, data which can be restored to the original picture signal using independent data are only intra-frame compression data. On the contrary, in case of inter-frame compression data, differential (predictive) signals only are decoded and therefore, in order to obtain the original picture signals, the preceding frame data are required. Therefore, only the intra-frame compression data out of playbacked signals are restored to the original picture and other data become unnecessary.

Now, it is assumed that the picture of the hatched section illustrated in FIG. 24 is restored by intra-frame compression data which are playbacked in the trick play operation and the hatched section corresponds to the small blocks. That is, the playbacked data of each sub-macro block of the first, the 8th, the 15th, the 22nd, . . . macro blocks of the prescribed frame can be decoded. In this case, therefore, data of each sub-macro block of the first, the 7th, 14th, . . . macro blocks only are recorded in the VCR. That is, following the data at the head position of the frame (FIG. 11(d)), the first sub-macro block data of the first macro block are extracted. That is, in the prescribed frame, the data of the first sub-macro block is extracted. Next, a correction is directed through the fourth passage for the second through the 7th sub-macro blocks of the first macro block. Similarly, the fourth passage is selected for the all sub-macro blocks of the second through the 7th macro blocks. That is, in this case, only the control signal directing the connection is transmitted. Next, the first sub-macro block of the 8th macro block selects the fourth passage, while the second small block selects the first passage. Hereafter, in the similar manner the variable length data for the portion corresponding to the hatched section in FIG. 24 are recorded and the control signal directing correction is recorded for other portions.

By selecting the fourth passage, data volume to be transmitted decreases and as a result, a surplus time is produced after transmitting the 360 the macro block data. So, the third passage is selected for time adjustment. FIG. 14 is a diagram for explaining the third passage by the oblique lines.

The oblique lined section in FIG. 14 illustrates an adjusting bit by the third passage. In FIG. 14, it is indicated that the data adjusting bit 59 is transmitted after transmitting the 360th macro block data.

As described above, the high efficient encoding/decoding system of the present invention has such effects as even when macro block data length information is not available and the operation on the passage for a quantization coefficient is not executed, the format transformation at a receiving section is facilitated, making it possible to perform the decoding using discontinuous data effectively and moreover, error propagation can be suppressed without deteriorating the data utilization efficiency.

As described above, the present invention can provide an extremely preferable high efficient encoding/decoding system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A high efficient encoding/decoding system comprising:

an encoding assembly which converts input data received by said encoding assembly into compressed data, said encoding assembly grouping said input data into encoding units and generating sub-macro blocks and macro blocks from said encoding units of input data, said macro blocks including macro block length data located at a head position thereof, said macro block length data indicating a length of said macro block, said macro blocks also including at least one of said sub-macro blocks therein, wherein said encoder assembly generates said sub-macro blocks such that each of said sub-macro blocks includes one of a) first output data including variable length data obtained by performing a variable length encoding on each of said encoding units of input data, header information associated with said variable length data, and sub-macro block length data indicating a length of said sub-macro block length data, b) second output data including adjustment bit data for keeping a transmission rate constant and adjustment bit length data indicating a length of said adjustment bit data, and c) third output data including a correction directing signal for directing a correcting operation, one of said first output data, said second output data and said third output data being generated based on selecting data included in said input data; and a transmission assembly that outputs said compressed data from said encoding/decoding system processor.

2. The encoding/decoding system as defined in claim 1, wherein said encoder assembly includes:

a variable length encoder which encodes said input data of each encoding unit into variable length data a data length measuring unit for measuring a length of said variable length data output by said variable length encoding unit and for and outputting data indicating said length of variable data output from the variable length encoder;

a header information generator for generating and outputting header information for the output of the encoder assembly;

a first packeting unit for combining outputs of said variable length encoder, said data length measuring unit, and said header information generator as said first output data, and for combining a predetermined adjustment bit data and said adjustment bit length data as said second output data, and for providing said correction direction signal as said third output data; and a second packeting unit for combining the outputs of the data length measuring unit and the header information generator with the outputs of the first packeting unit, thereby defining a macro block containing at least one of said sub-macro blocks.

3. A high efficient encoding/decoding system comprising:

means for processing a sub-macro block of data having at least one collection of data blocks as an encoding unit of input data; and means for processing a macro block of data, said macro block having macro block length data indicating a length of said macro block located in its head position and said macro block including at least one of the sub-macro blocks therein, wherein said means for processing said sub-macro block of data includes:

means for providing a collection of data blocks in said sub-macro block such that said sub-macro blocks of data include one of:

a) first output data including variable length data having at least one collection of data obtained by performing a variable length encoding for every block of data in said encoding unit of input data, header information associated with said variable length data and said sub-macro block itself when intra-frame coding is performed;

b) second output data including adjustment bit data for keeping a transmission rate constant; and c) third output data including a correction directing signal for directing a correcting operation, said means for providing a collection of data blocks in said sub-macro blocks of data determining which of said first output data, said second output data and said third output data is to be provided based on selecting data embedded in a coefficient which is based on an encoding characteristics of said variable length data, said selecting data being provided with said input data.

4. The encoding/decoding system as defined in claim 3, wherein said means for processing a sub-macro block of data includes:

variable length encoder for transmitting data after variable length encoding every block of encoding unit on the input data takes place;

a data length measuring unit for measuring and outputting data length information for the data output from the variable length encoder;

a header information generator for generating and outputting header information for the data output of the encoder;

said means for providing a collection of data blocks in each of said sub-macro blocks of data includes:

a first packeting unit for performing at least one of said operations for packeting the outputs of said variable length encoder, said data length measuring unit and said header information generator as said first output data, and for allocating a predetermined adjustment bit data and length data indicating the length of the adjustment bit data itself as said second output, and for packeting a correction direction signal as said third output data; and said means for processing said macro block of data includes:

a second packeting unit for packeting and outputting a special code identifying data of a macro block and said output of said header information generator into said output of said first packeting unit, by defining a macro block as containing at least one of said sub-macro blocks.

5. An encoding/decoding system as defined in claim 3, further comprising:

a recording system adapted for receiving an input signal which contains in every frame at least one macro block of data having at least one sub-macro block of data containing at least one encoding unit block of data and a special code allocated on a head position of said macro block for indicating a position of macro block, wherein said recording system includes:

a detector for detecting said macro block on a head position of a picture screen;

an address generator for generating an address corresponding to at least one screen position of said respective macro blocks of data and respective sub-macro blocks of data; and a packeting unit for packeting said address from said address generator and said information of said head position of said picture screen in said macro blocks with said input signal.

6. An encoding/decoding system as defined in claim 3, further comprising:

a reproducing system adapted for reproducing a recorded signal, wherein said reproducing system includes:

an extractor for extracting intra-frame compression data from a reproduced signal;

a reconstructing unit capable of reconstructing intra-frame compression data at a prescribed time unit;

a first adder for adding a skip flag to an output of said reconstructing unit at a timing other than that of intra-frame compression data; and a second adder capable of adding an adjusting bit for adjusting data length to an output of said reconstructing unit.

* * * * *